United States Patent
Gotou et al.

(10) Patent No.: US 6,377,886 B1
(45) Date of Patent: *Apr. 23, 2002

(54) NAVIGATION APPARATUS AND MEDIUM RECORDING PROGRAM THEREFOR

(75) Inventors: Shinichirou Gotou; Takeshi Imai; Masayuki Ikegami; Hideshi Sawada; Toshihide Youfu, all of Wako (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,756

(22) Filed: Jul. 29, 1998

(30) Foreign Application Priority Data

Jul. 31, 1997 (JP) .............................................. 9-206957

(51) Int. Cl.⁷ .............................................. G01C 21/00
(52) U.S. Cl. ...................................... 701/201; 709/203
(58) Field of Search ................................. 701/201, 208, 701/211; 340/995; 395/200.33; 709/203; 342/357.09, 357.1

(56) References Cited

U.S. PATENT DOCUMENTS

| | | | |
|---|---|---|---|
| 5,794,164 A | * 8/1998 | Beckert et al. | 455/456 |
| 5,890,172 A | * 3/1999 | Borman et al. | 707/501 |
| 5,892,905 A | * 4/1999 | Brandt et al. | 713/201 |
| 5,930,474 A | * 7/1999 | Dunworth et al. | 707/10 |
| 5,938,721 A | * 8/1999 | Dussell et al. | 701/211 |
| 5,948,040 A | * 9/1999 | DeLorme et al. | 701/201 |
| 5,959,577 A | * 9/1999 | Fan et al. | 342/357.13 |

FOREIGN PATENT DOCUMENTS

| | | |
|---|---|---|
| JP | 5-241504 | 9/1993 |
| JP | 9-166450 | 6/1997 |
| WO | WO 97/18635 | 5/1997 |

OTHER PUBLICATIONS

ASCII Handbook of Personal Computing Terms, Version 2, pp. 545–546, w/English Translation of relevant portion. No Date.

Jameel et al.; Internet multimedia on wheels: connecting cars to cyberspace; IEEE Conference– Intelligent Transportation System; Nov. 9–12, 1997; pp. 637–642.*

* cited by examiner

Primary Examiner—Michael J. Zanelli
(74) Attorney, Agent, or Firm—Arent Fox Kintner Plotkin Kahn PLLC

(57) ABSTRACT

A vehicle mounted unit 1 has a WWW browser for analyzing and discriminating HTML files obtained from the Internet. The HTML files are provided with a tag for the navigation apparatus (extension tag) in addition to a normal tag. The normal tag includes a descriptive statement which is now widely used on the Internet. The extension tag includes a descriptive statement newly defined for the navigation apparatus, and controls the operation of the vehicle unit 1. The vehicle unit 1 discriminates the normal tag and the extension tag at the time of receiving the HTML file, and in the case of a normal tag, executes normal operation (screen display such as characters), and in the case of an extension tag, executes functions for the navigation apparatus.

24 Claims, 22 Drawing Sheets

FIG.9

| TYPE | COMMENT |
|---|---|
| HYPER_POS_CUR | PRESENT POSITION |
| HYPER_POS_DST | POSITION OF DESTINATION |
| HYPER_POS_DSTRTE | DESTINATION TO INITIATE ROUTE CALCULATION |
| HYPER_POS_MEM1 | SPOT 1 ON ROUTE |
| HYPER_POS_MEM1 | SPOT 2 ON ROUTE |
| HYPER_POS_MEM1 | SPOT 3 ON ROUTE |
| HYPER_POS_MEM1 | SPOT 4 ON ROUTE |
| HYPER_POS_MEM1 | SPOT 5 ON ROUTE |
| HYPER_POS_MARK | REGISTERED SPOT (MARK SET) |
| HYPER_WEATHER | WEATHER INFORMATION (OF SPECIFIED SPOT) |
| HYPER_EXTEND | OTHERS (FOR FUTURE EXTENSION) |
| | |
| HYPER_CTL_MAP | INSTRUCTION TO CHANGE OVER FROM BROWSER MODE TO NAVIGATION (MAP DISPLAY) MODE |
| HYPER_CTR_SCALE | DESIGNATION OF SCALE AT TIME OF TRANSITION OF NAVIGATION (MAP DISPLAY) MODE |
| HYPER_CTR_CALLON | INSTRUCTION TO AUTOMATICALLY CALL TELEPHONE NUMBER INDICATED BY "PHONE-NUMBER" |
| HYPER_CTR_DISCON | INSTRUCTION TO DISCONNECT TELEPHONE LINE |
| HYPER_CTR_GROUP | DESIGNATION FOR GROUPING A PLURALITY OF FACILITIES ON DISPLAY |
| | |
| MAP | STREET MAP DATA |
| CENTER | INFORMATION CENTER CONNECTING POINT (ACCESS POINT) |
| IMG | IMAGE DATA |
| TEXT | TEXT DATA |
| BIN | BINARY DATA |

FIG.10

| KEY WORDS | DATA | DESCRIPTION |
|---|---|---|
| NAME | CHARACTER STRING | NAME |
| YOMIKANA | CHARACTER STRING | PRONUNCIATION |
| POSITION-LATITUDE | INTEGER | X COORDINATE (SECONDARY MESH NORMALIZED COORDINATE) DESCRIBED IN DECIMAL NOTATION |
| POSITION-LATITUDE-GUIDE | INTEGER | X COORDINATE USED IN ROUTE CALCULATION. IF NO DESCRIPTION, POSITION-LATITUDE IS TO BE CALCULATED |
| POSITION-LONGITUDE | INTEGER | Y COORDINATE (SECONDARY MESH NORMALIZED COORDINATE) |
| POSITION-LONGITUDE-GUIDE | INTEGER | Y COORDINATE USED IN ROUTE CALCULATION. IF NO DESCRIPTION POSITION-LONGITUDE IS TO BE CALCULATED |
| ICO-MAP-FILE | CHARACTER STRING | FILE NAME OF ICON DATA FOR DISPLAY |
| ICO-LIST-FILE | CHARACTER STRING | FILE NAME OF ICON DATA FOR SUMMARY LIST DISPLAY |
| ICO-TEXT-FILE | CHARACTER STRING | FILE NAME OF CHARACTER INFORMATION FILE OF HYPER ICON |
| ICO-BIN-FILE | CHARACTER STRING | FILE NAME OF BINARY DATA FILE OF HYPER ICON |
| IMG-FILE | CHARACTER STRING | FILE NAME OF IMAGE FILE |
| TEXT-FILE | CHARACTER STRING | TEXT FILE NAME |
| BIN-FILE | CHARACTER STRING | BINARY FILE NAME |
| PHONE-NUMBER | CHARACTER STRING | TELEPHONE NUMBER |
| URL | CHARACTER STRING | DESIGNATES URL |
| MAP-SCALE | CHARACTER STRING | DESIGNATES SCALE AT TIME OF DISPLAYING A MAP. DESCRIBES THE DISTANCE IN UNIT OF "m" REQUIRED TO FIT DISCRETE PLURAL SPOT DATA |
| TIME-STAMP | INTEGER | PREPARATION DATE OF FILE (NUMBER OF SECONDS FROM 1970.1.1.0:00) |
| TIME-EFFECTIVE | INTEGER | EFFECTIVE PERIOD (SECONDS) OF DATA |

*TIME-STAMP IS GMT

FIG.11A

| ITEM NAME | NUMBER OF BYTES | DESCRIPTION |
|---|---|---|
| CENTER INFORMATION NUMBER | 2 | NUMBER OF CENTER INFORMATION TO BE TRANSMITTED |
| INFORMATION VERSION | 2 | INFORMATION VERSION OF CENTER |
| EXTENSION 1 | 4 | FOR EXTENSION |
| EXTENSION 2 | 4 | FOR EXTENSION |
| EXTENSION 3 | 4 | FOR EXTENSION |
| CENTER INFORMATION 1 | 160 | REFER TO DETAILS OF CENTER INFORMATION FORMAT |
| . . . | | |
| CENTER INFORMATION n | 160 | REFER TO DETAILS OF CENTER INFORMATION FORMAT |

FIG.11B

| ITEM NAME | NUMBER OF BYTES | DESCRIPTION |
|---|---|---|
| CENTER ID | 4 | ID OF INFORMATION CENTER |
| EXTENSION 1 | 12 | FOR EXTENSION |
| CENTER NAME | 32 | CENTER NAME FOR DISPLAY ON CONNECTION LIST S-JIS JAPANESE DISPLAY (WITHIN 15 CHARACTERS) |
| TELEPHONE NUMBER | 16 | TELEPHONE NUMBER TO BE CONNECTED "-", "(" AND ")" MAY BE USED. |
| DNS ADDRESS | 16 | IP ADDRESS OF DNS SERVER |
| URL | 64 | HOMEPAGE ADDRESS STARTING WITH HTTP:// |
| EXTENSION 2 | 16 | FOR EXTENSION |

FIG.12

| TYPE | NAME | DATA | SIZE | DESCRIPTION |
|---|---|---|---|---|
| SOFT-VERSION | MAKER | CHARACTER STRING | 32BYTE (MAX) | DESIGNATION SUCH AS OEM |
| | PRODUCTNAME | DITTO | DITTO | TERMINAL NAME |
| | BROWSERVERSION | DITTO | DITTO | SOFT VERSION OF BROWSER |
| | NAVIVERSION | DITTO | DITTO | VERSION OF NAVISOFT |
| PASSWORD | LOGINNAME | DITTO | DITTO | LOG-IN NAME |
| | LOGINPASSWORD | DITTO | DITTO | PASSWORD |
| | MAILNAME | DITTO | DITTO | MAIL USER NAME |
| | MAILPASSWORD | DITTO | DITTO | MAIL PASSWORD |
| | ENCRYPTION | NUMERAL CHARACTER STRING | ENCRYPTION TYPE | 0: NONE 1: EXCLUSIVE "OR" |
| POSITION | CUR_POS | HEX CHARACTER STRING | 16BYTE (4+4) | COORDINATES OF PRESENT LOCATION |
| | CUR_POS_TEXT | CHARACTER STRING | 32BYTE (MAX) | NAME OF PRESENT LOCATION |
| | DST_POS | HEX CHARACTER STRING | 16BYTE (4+4) | COORDINATES OF DESTINATION |
| | DST_POS_TEXT | CHARACTER STRING | 32BYTE (MAX) | NAME OF DESTINATION |
| | SEL_POS | HEX CHARACTER STRING | 16BYTE (4+4) | COORDINATES OF OPTIONALLY DESIGNATED POSITION |
| | SEL_POS_TEXT | CHARACTER STRING | 32BYTE (MAX) | NAME OF OPTIONALLY DESIGNATED POSITION |
| | MEM1_POS | HEX CHARACTER STRING | 16BYTE (4+4) | COORDINATES OF SPOT 1 ON ROUTE |
| | MEM1_POS_TEXT | CHARACTER STRING | 32BYTE (MAX) | NAME OF SPOT 1 ON ROUTE |
| | MEM2_POS | HEX CHARACTER STRING | 16BYTE (4+4) | COORDINATES OF SPOT 2 ON ROUTE |
| | MEM2_POS_TEXT | CHARACTER STRING | 32BYTE (MAX) | NAME OF SPOT 2 ON ROUTE |
| | MEM3_POS | HEX CHARACTER STRING | 16BYTE (4+4) | COORDINATES OF SPOT 3 ON ROUTE |
| | MEM3_POS_TEXT | CHARACTER STRING | 32BYTE (MAX) | NAME OF SPOT 3 ON ROUTE |
| | MEM4_POS | HEX CHARACTER STRING | 16BYTE (4+4) | COORDINATES OF SPOT 4 ON ROUTE |
| | MEM4_POS_TEXT | CHARACTER STRING | 32BYTE (MAX) | NAME OF SPOT 4 ON ROUTE |
| | MEM5_POS | HEX CHARACTER STRING | 16BYTE (4+4) | COORDINATES OF SPOT 5 ON ROUTE |
| | MEM5_POS_TEXT | CHARACTER STRING | 32BYTE (MAX) | NAME OF SPOT 5 ON ROUTE |
| CNTPARAM | PARAMETER | — | — | CENTER PARAMETER |
| SUBMIT2 | — | — | — | SUBMIT FOR DATA TRANSMISSION |

○×HOT SPRING
ADDRESS: ..............
TEL: ..............
FEATURES: ..............
[CONFIRM MAP]

RETURN

○×HOT SPRING
ADDRESS: ..............
TEL: ..............
FEATURES: ..............
[SET DESTINATION]

NAVIGATION APPARATUS AND MEDIUM RECORDING PROGRAM THEREFOR

BACKGROUND OF THE INVENTION

1. Field of the Invention

The present invention relates to a navigation apparatus for providing information to vehicles, and a medium recording a program therefor.

2. Description of the Related Art

As a system for providing information to vehicles, conventionally there are for example; (1) those which display the position of other vehicles (communication between vehicles, 1:1), and (2) those which provide traffic information by means of VICS (between an information center and a plurality of vehicles).

FIG. 25 is a diagram showing an example of the construction of a conventional navigation system. In this figure, information providers 13 provide information (spot information and various related information accompanying the spot information) for users (drivers) of vehicles on which the units are mounted (hereinafter referred to as "vehicle units") 11. As shown in this figure, with the conventional navigation system, an information center 12 collects information individually from the information providers 13 and transmits the information to the vehicle units 11.

With the conventional navigation system described above, the information center has to decide in advance on the communication format and the like between the individual information providers. Moreover, it is necessary for the information center to convert the communication format when transmitting the collected information to the vehicle units. Thus, with the conventional navigation system, there has been the problem that the load on the information center is large.

On the other hand, when using the Internet, since the communication format is unified in a TCP/IP form, it is possible to collect information directly from computers around the world. The communication format of the Internet, however, is basically designed for personal computers, and hence it cannot be used for a navigation apparatus as it is. For example, even if the information obtained from the Internet (information of facilities and tourist spots, or the like) is desired to be set as a destination, since the Internet information (HTML file) has only display information (characters and the like), the information cannot be set as the destination of the vehicle.

SUMMARY OF THE INVENTION

In view of the above situation, it is an object of the present invention to provide a navigation apparatus which can directly utilize the information (information of facilities and tourist spots, or the like) obtained from the Internet.

It is an another object of the present invention to provide a medium on which is recorded a program for making a computer function as the abovementioned navigation apparatus.

The present invention comprises; a reception device for receiving an information file from an information server, a discrimination device for analyzing the received information file and discriminating a descriptor for a character display from a descriptor for a navigation function, a display function executing device for executing in the case of discriminating a descriptor for a character display, a character display based on the descriptor, and a navigation function executing device for executing in the case of discriminating a descriptor for a navigation function, a navigation function based on the descriptor. As a result, information files in which conventionally only data for screen display has been transmitted can be extended for the navigation function, and the descriptor for the navigation function contained in the extended information file can be discriminated to execute the navigation function.

Furthermore, the present invention is characterized in that a program is recorded which makes a computer function as; a reception device for receiving an information file from an information server, a discrimination device for analyzing the received information file and discriminating a descriptor for a character display from a descriptor for a navigation function, a display function executing device for executing in the case of discriminating a descriptor for a character display, a character display based on the descriptor, and a navigation function executing device for executing in the case of discriminating a descriptor for a navigation function, a navigation function based on the descriptor.

Preferably, the information file has the names of specific spots, characteristic information and positional information, the display function executing device displays the names of specific spots and characteristic information from the information file, and the navigation function executing device sets the positional information corresponding to a specific spot selected by a driver as a destination.

Preferably, the information server is a server on the Internet and the information file is an HTML file.

With the present invention, the reception device first receives the information file from the information server. The discrimination device analyzes the information file and discriminates the descriptor for the character display and the descriptor for the navigation function. Here, if the information file is discriminated as the descriptor for the character display, the display function executing device displays characters based on the descriptor. On the other hand, if the information file is discriminated as the descriptor for the navigation function, the navigation function executing device executes the navigation function.

Furthermore, with the present invention, the display function executing device displays the name of the specific spot and characteristic information from among the information files. The navigation function executing device sets positional information corresponding to the specific spot selected by the driver as a destination.

Moreover, with the present invention, the information server handles the information file as an HTML file on the Internet.

According to the present invention, the descriptor for the navigation function is received in the format of the information file, and the navigation function can be executed based on the descriptor.

In addition, according to the present invention, the names of specific spots, characteristic information and positional information are received, and from among these the name of a specific spot and the characteristic information can be displayed, and the positional information corresponding to a selected specific spot can be set as the destination.

Moreover, according to the present invention, the information obtained from the Internet (information on facilities and tourist spots, and the like) can be directly utilized with the navigation apparatus. Furthermore, according to the present invention, the information obtained from the Internet can be set on the navigation apparatus as the destination.

BRIEF DESCRIPTION OF THE DRAWINGS

FIG. 9 is a diagram showing an example of NAVIDATA types;

FIG. 10 is a diagram showing an example of NAVIDATA key words;

FIGS. 11A and 11B are diagrams showing an example of the format of center information;

FIG. 12 is a diagram showing an example of NAVIINPUT types and NAVIINPUT names;

DESCRIPTION OF THE PREFERRED EMBODIMENT

An embodiment of the present invention will now be described with reference to the drawings.

Figure 1:
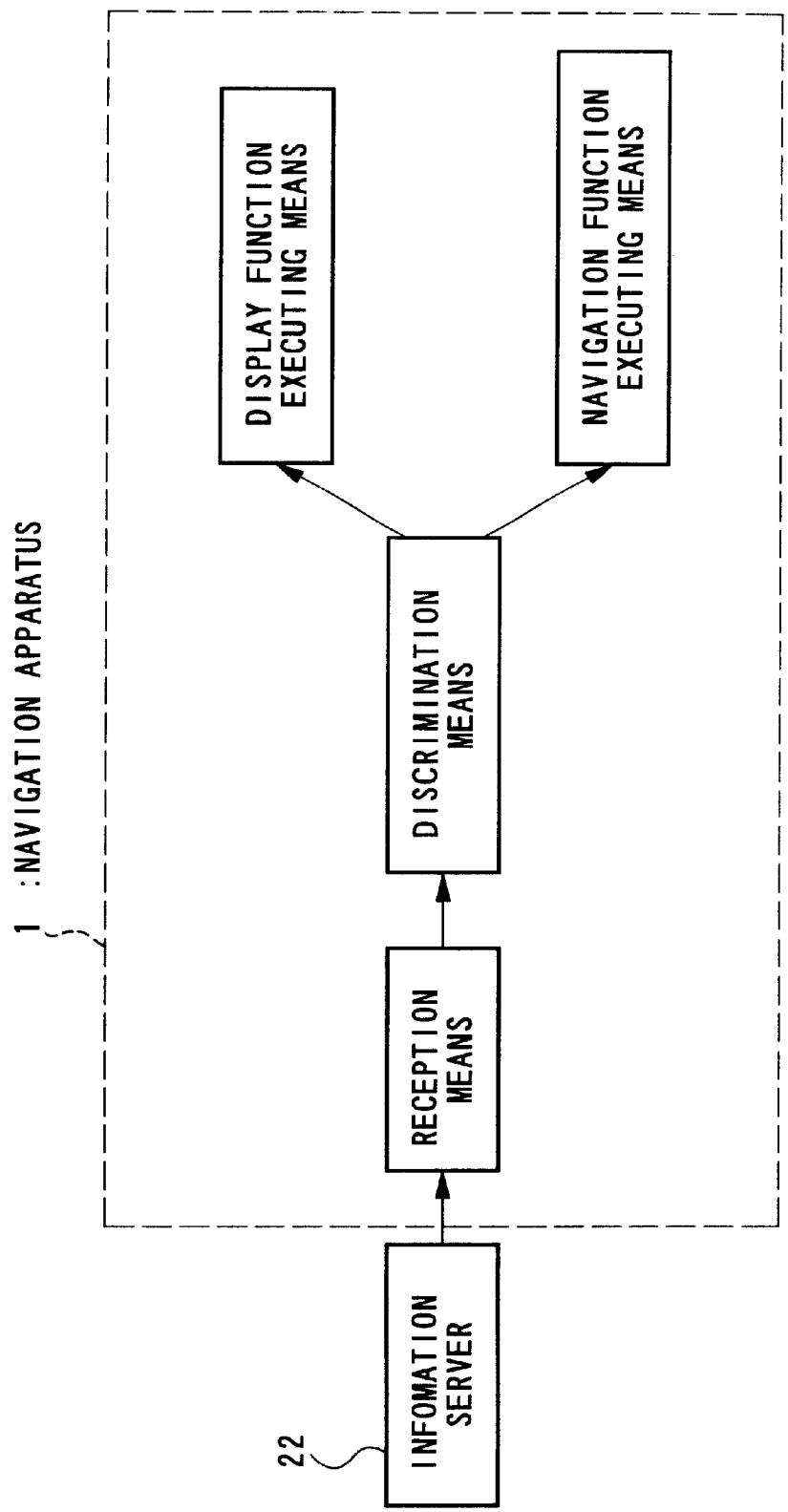
FIG. 1 is a block diagram corresponding to claim 1.

FIG. 1 is a block diagram corresponding to claim 1. In FIG. 1, information server 22 is a storage device (hard disk etc) provided with information center 2 or a storage device (hard disk etc) provided with information providers 3. Reception means for receiving an information file from an information server, said information file contain information described by predetermined descriptor. Discrimination means for analyzing said received information file and for discriminating said information file is described by a descriptor for a character display, or described by a descriptor for a navigation function. Display function executing means for executing character display function based on said descriptor for a character display, when it is discriminated as a descriptor for a character display. Navigation function executing means for executing navigation function based on said descriptor for a navigation function, when it is discriminated as a descriptor for a navigation function.

Figure 2:
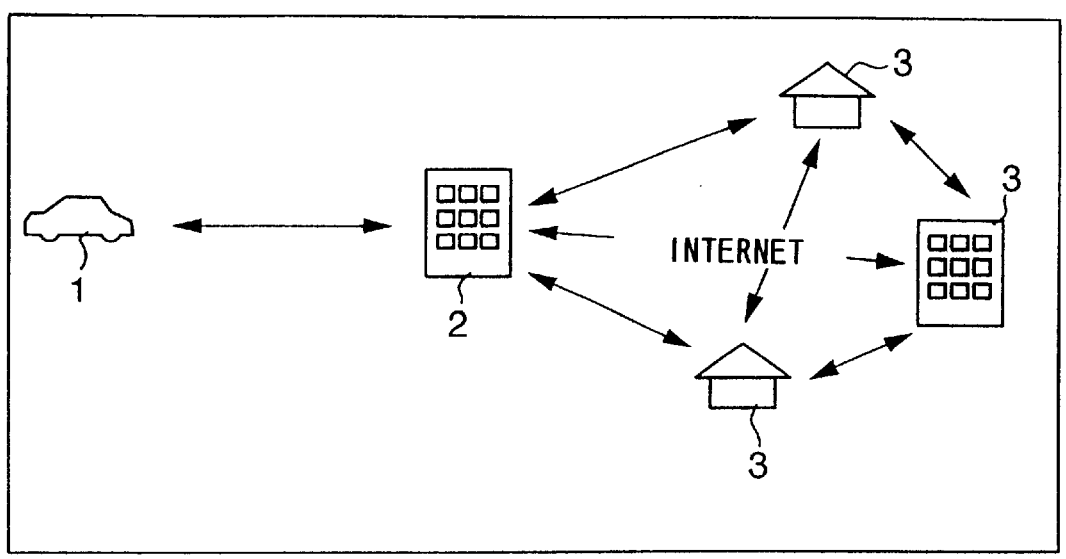
FIG. 2 is a diagram showing an example of the construction of a navigation system according to an embodiment of the present invention.

FIG. 2 is a diagram showing an example of the construction of a navigation system according to the embodiment.

In FIG. 2, an information center 2 and a vehicle unit 1 are actually a computer unit comprising a CPU (central processing unit) and its peripheral circuits (ROM, RAM, clock circuit, I/O interface and the like), and operate according to a control program stored in a built-in storage medium (ROM or the like) or an outside storage medium (CD-ROM or the like). Here, the control program stored in the abovementioned storage medium (ROM, CD-ROM or the like) is a program for the CPU of the vehicle unit 1 and information center 2, to execute processing shown in the flow charts of FIGS. 7, 14, 16, 18, 20 and 21.

An information provider 3 is also a computer unit, and provides information (spot information and various related information accompanying the spot information) for the user (driver) of the vehicle unit 1, on the Internet.

Figure 3:
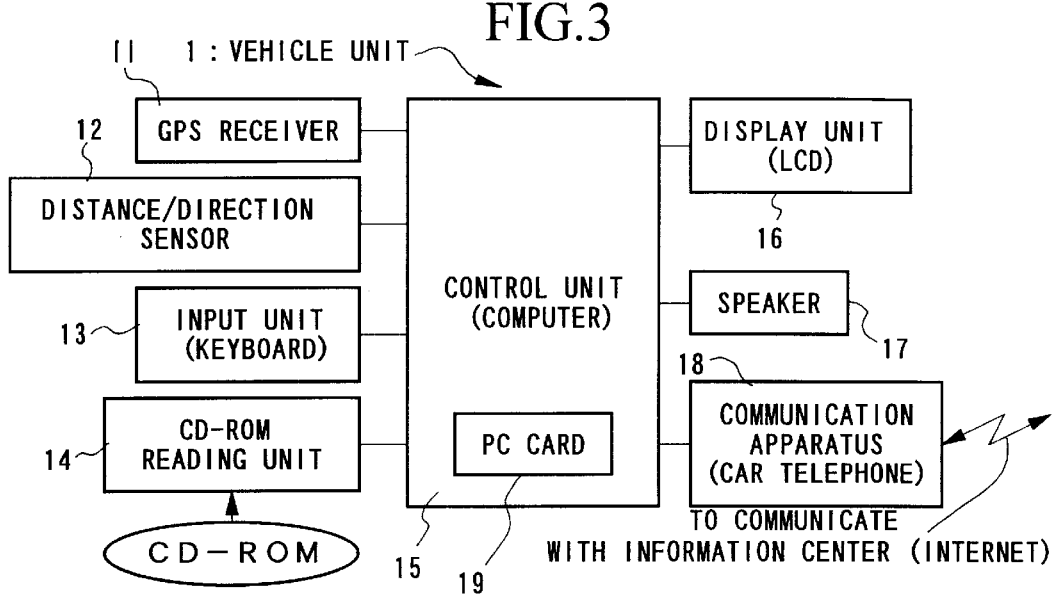
FIG. 3 is a diagram showing a detailed construction of a vehicle unit 1.

FIG. 3 is a diagram showing a detailed construction of the vehicle unit 1.

The vehicle unit 1 according to this embodiment comprises a GPS receiver 11, a distance/direction sensor 12, an input unit 13, a CD-ROM reading unit 14, a control unit 15 (including a PC card 19), a display unit 16, a speaker 17 and a communication apparatus 18. The vehicle unit 1 as the basic navigation function, detects the present spot, displays a map, and calculates the route, and thereby guides the driver by screen and sound using the display unit 16 and the speaker 17.

The communication apparatus 18 is for communicating with the information center 2 via the Internet, and is, for example, a car phone.

When the abovementioned program of the vehicle unit 1 is stored in a CD-ROM (not in a built-in ROM), the control program is read by the CD-ROM reading unit 14 and stored in the built-in RAM of the vehicle unit 1. In this case, it is not necessary to prepare one CD-ROM only for the abovementioned control program, and the control program may be stored on the CD-ROM of a conventional system which has stored map information and the like.

Figure 4:
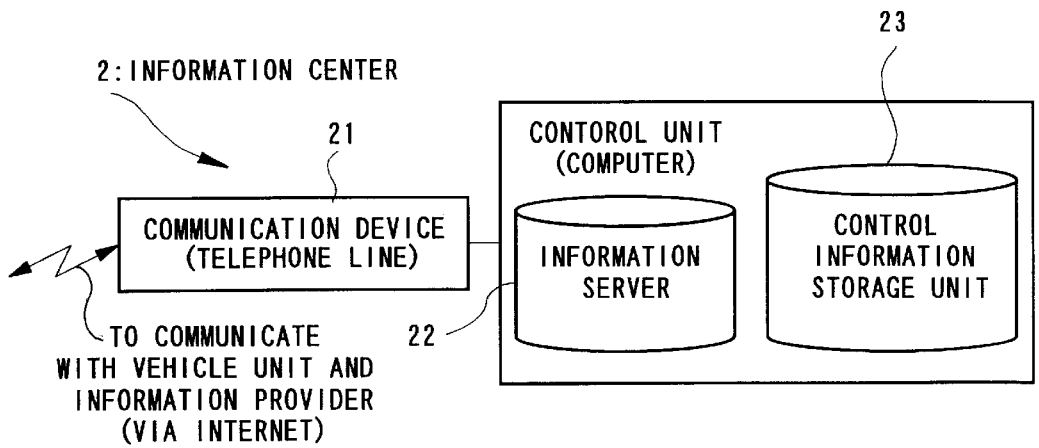
FIG. 4 is a diagram showing a detailed construction of an information center 2.

FIG. 4 is a diagram showing a detailed construction of the information center 2.

The information center 2 comprises a communication device 21, an information server 22, and a control information storage unit 23.

The control information storage unit 23 stores the control information of each vehicle unit (user) 1. The control information includes, as an example, user ID, password, charging information and the like. Moreover, the control information storage unit 23 stores the logic address (URL) of each information provider 3, and categories and summaries of information provided by each information provider 3.

The information server 22 stores (1) positional information (physical location) of specific spots (facilities or the like), and (2) characteristic information of the specific spots (the names, addresses, telephone numbers, business hours, fees and other characteristics of the facilities), and provides the information to the vehicle unit 1. Moreover, when the information server 22 itself does not capture the information requested by the vehicle unit (user) 1, the information server 22 reads the information from the information provider 3 via the Internet, and provides the read information to the vehicle unit 1. In this case, the information server 22 specifies the information provider 3 which has the information requested by the vehicle unit (user) 1, based on the logic address and the information category/summary stored in the control information storage unit 23.

Figure 5:
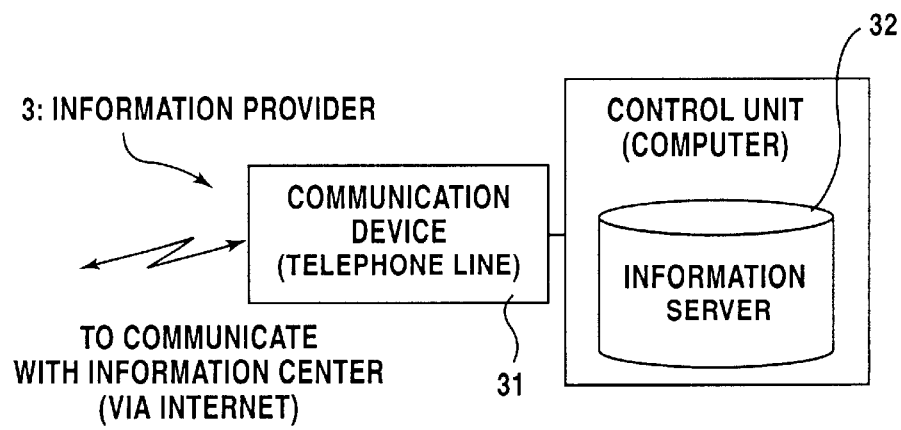
FIG. 5 is a diagram showing a detailed construction of an information provider 3.

FIG. 5 is a diagram showing a detailed construction of the information provider 3.

The information provider 3 includes a communication device 31 and an information server 32.

The computer of the information provider 3 provides information (home page) on the Internet. For that purpose, the information server 32 stores various information (home page information such as facilities and restaurants) to be provided on the Internet.

Figure 6:
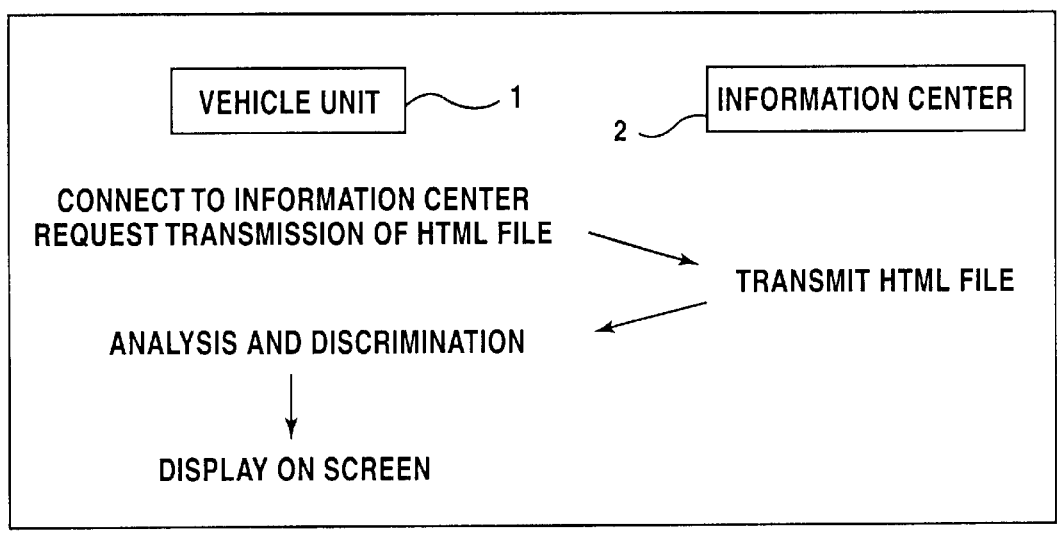
FIG. 6 is a diagram showing an example of communication operation according to the embodiment.

FIG. 6 is a diagram showing an example of the communication operation according to the embodiment.

As shown in FIG. 6, the information on the Internet can be normally obtained in the format of a character file which is referred to as an "HTML" file.

With the HTML file, the description method for files exchanged on the Internet is defined, and on the receiving side, characters are displayed on the screen in a predetermined position, color, size of characters, font and the like according to the description. Moreover, when a file name is specified in the HTML files, the image data for the file name can be displayed.

With this embodiment, the vehicle unit 1 includes a PC card 19, and downloads the HTML file onto the PC card 19.

On the other hand, the application for appropriately analyzing and discriminating the HTML file and displaying the information in the HTML file is referred to as a "WWW browser" The vehicle unit 1 uses the WWW browser to analyze and discriminate the HTML file and display the information in the HTML file.

The operation shown in FIG. 6 will now be explained again, using a flow chart.

Figure 7:
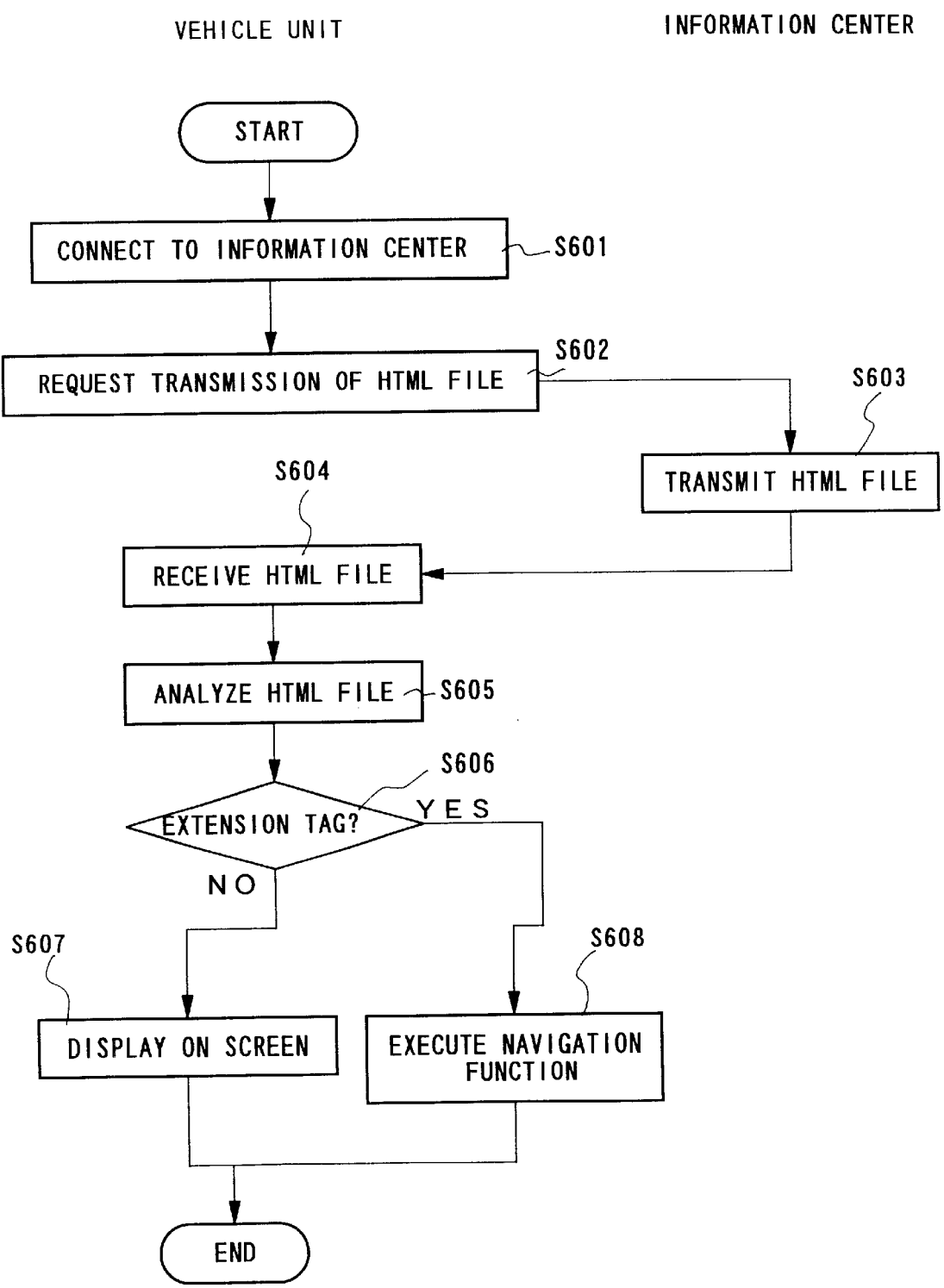
FIG. 7 is a flow chart showing an example of communication operation according to the embodiment.

FIG. 7 Is a flow chart showing one example of the communication operation according to the embodiment.

At first the vehicle unit 1 connects to the information center 2 (Step S601).

Upon completion of the connection, the vehicle unit 1 transmits a transmission request for an HTML file to the information center 2 (Step S602).

Upon receipt of the transmission request, the information center 2 transmits the HTML file to the vehicle unit 1 (Step S603).

The vehicle unit 1 then receives the transmitted HTML file (Step S604).

The vehicle unit 1 then analyzes the received HTML file (Step S605).

The vehicle unit 1 discriminates whether the descriptive content of the received HTML file is a normal tag or an extension tag (descriptor for navigation) based on the analysis result (Step S606). Regarding the normal tag and the extension tag, a description will be given later with reference to FIG. 8. More specifically, when a tag not normally used on the Internet, such as <NAVIDATA>, <NAVIINPUT> or the like is found in the HTML file, the vehicle unit 1 discriminates the description within the range of from <NAVIDATA> to </NAVIDATA> or from <NAVIINPUT> to </NAVIINPUT> as the descriptor for the navigation function (extension tag).

When this discrimination result is "NO", the vehicle unit 1 displays the screen, based on the normal tag in the HTML file (Step S607).

On the other hand, when this discrimination result is "YES", that is, when an extension tag exists in the HTML file, the vehicle unit 1 executes the navigation function, based on the extension tag (Step S608).

Figure 8:
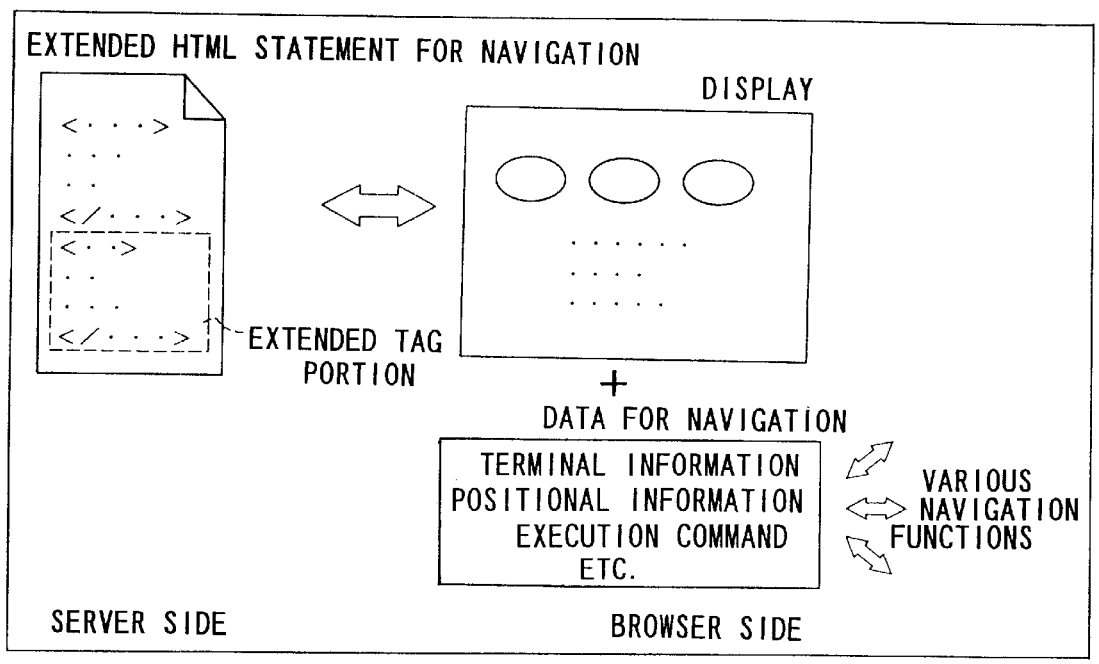
FIG. 8 is a diagram showing an example of an HTML file according to the embodiment.

FIG. 8 is a diagram showing an example of an HTML file according to the embodiment.

The descriptive content in the HTML file is herein referred to as a "TAG".

As shown in FIG. 8, with this embodiment, the HTML file is extended for the navigation apparatus. That is to say, with this embodiment, a tag for the navigation apparatus (referred to as an "extension tag") is provided in addition to the normal tag (referred to as a "normal tag") in the HTML file. The normal tag includes a descriptive statement which is now widely used on the Internet, and is described by reserved words (<HEAD>, <BODY>, <TITLE> and the like) for the HTML statement.

Regarding the extension tag, this includes a descriptive statement newly defined for the navigation apparatus, and controls the operation of the vehicle unit 1.

The vehicle unit 1 discriminates the normal tag and the extension tag at the time of receiving the HTML file, and in the case of a normal tag, executes normal operation (screen display such as characters), and in the case of an extension tag, executes functions for the navigation apparatus.

With this embodiment, the extension tag includes two types; NAVIDATA and NAVIINPUT. The NAVIDATA is a tag for delivering various information to the vehicle unit 1. The NAVIINPUT is a tag for delivering mainly terminal information of the vehicle unit 1 to the information center 2.

In addition, with this embodiment, the following attributes are added.

(1) CACHE . . . An attribute for specifying the cache method of the data is added to <HTML><IMAG> (permanent, temporary).

(2) SCROLL . . . In consideration of the display screen for the vehicle unit, ON/OFF of the scroll is made controllable (on/off).

Basically, the NAVIDATA specifies the types and storage places of the data in a free format. Therefore, the NAVIDATA is described when the data of the information center 2 is downloaded to the vehicle unit 1. The format of the NAVIDATA is as follows:
<NAVIDATA TYPE=XXXX SRC=YYYY FILE=ZZZZ>
. . .
. . .
</NAVIDATA>

Here, the character string XXXX indicates the type of the NAVIDATA (hereinafter, referred to as "NAVIDATA type"). FIG. 9 is a diagram showing an example of NAVIDATA types.

The character string YYYY indicates the URL of the NAVIDATA.

The character string ZZZZ indicates the directory name and file name where the data is downloaded. For convenience sake, the directory is defined by the NAVIDATA type (XXXX) as

| NAVIDATA type | Directory |
|---|---|
| HYPER_POS_xxx | /nvdatadr/hyperpos/ |
| HYPER_WEATHER | /nvdatadr/hyperwzr/ |
| HYPER_EXTEND | /nvdatadr/hyperext/ |
| CENTER | /nvdatadr/center/ |
| IMG | /nvdatadr/img/ |
| TEXT | /nvdatadr/text/ |
| BIN | /nvdatadr/bin/ |

FIG. 10 is a diagram showing an example of key words for the NAVIDATA.

An example of the NAVIDATA is shown below.

<NAVIDATA TYPE=HYPER_POS_DST SRC=/www.navinet.ne.jp/data/ FILE=/nvdatadr/ hyperpos/> name="Tennoji Koen"

position-latitude=3012675 position-longitude=4352410 ico-map-file="tennojim.bmp"

ico-list-file="tennoji.bmp"

</NAVIDATA>

Furthermore, the information for connecting to the information center 2 (telephone number of the access point, DNS address and the like, hereinafter referred to as "center information") is delivered to the vehicle unit 1 in a format shown in FIGS. 11A and 11B.

FIGS. 11A and 11B are diagrams showing an example of the format of the center information. FIG. 11A shows center information format (variable length), while FIG. 11B shows the details of "center information 1"~"center information n". The "center information 1"~"center information n" are each information of a fixed length of 160 bytes.

NAVIINPUT describes the contents of data such as connection information, registered spot information on the vehicle unit 1 side, to be uploaded to the information center 2 by CGI. The format of the NAVIINPUT is as follows:

<NAVIINPUT TYPE=XXXX NAME=YYYY>

. . .

. . .

</NAVIINPUT>

Here the character string XXXX indicates the type of the NAVIINPUT (hereinafter, referred to as "NAVIINPUT type"). In addition, the character string YYYY Indicates the name of the NAVIINPUT (hereinafter, referred to as "NAVI-INPUT name"). FIG. 12 is a diagram showing an example of NAVIINPUT types and NAVIINPUT names.

General data formats other than the abovementioned format will now be described. With regard to data having no description, data is described according to the following format.

1) Description is performed in the ASCII text format.
   Character string: Alphabet characters encompassed by " ", and SJIS, the number of characters should be within 30 characters.
   Integer: Decimal number with a code of not larger than 10 figures expressed by ASCII numerals.
   Real number: Decimal number with a code of not larger than 20 figures expressed by ASCII numerals.
2) The key words may be described in any order.
3) In one data, NAVIDATA type, key word and the like should not be used redundantly.
4) When designating a directory to which the data is downloaded, Chinese characters cannot be used for the file name. In addition, the number of characters for the file name should be not larger than 64 characters converted to half size.
5) NAVIINPUT should exist within a range encompassed by <FORM> and </FORM>.
6) NAVIINPUT can co-exist with tags relevant to other forms (<INPUT>, <SELECT>, <OPTION>), within a range encompassed by <FORM> and </FORM>.

The operation of the navigation system with the above-mentioned construction will now be described.

(1) Destination Set

Figure 13:
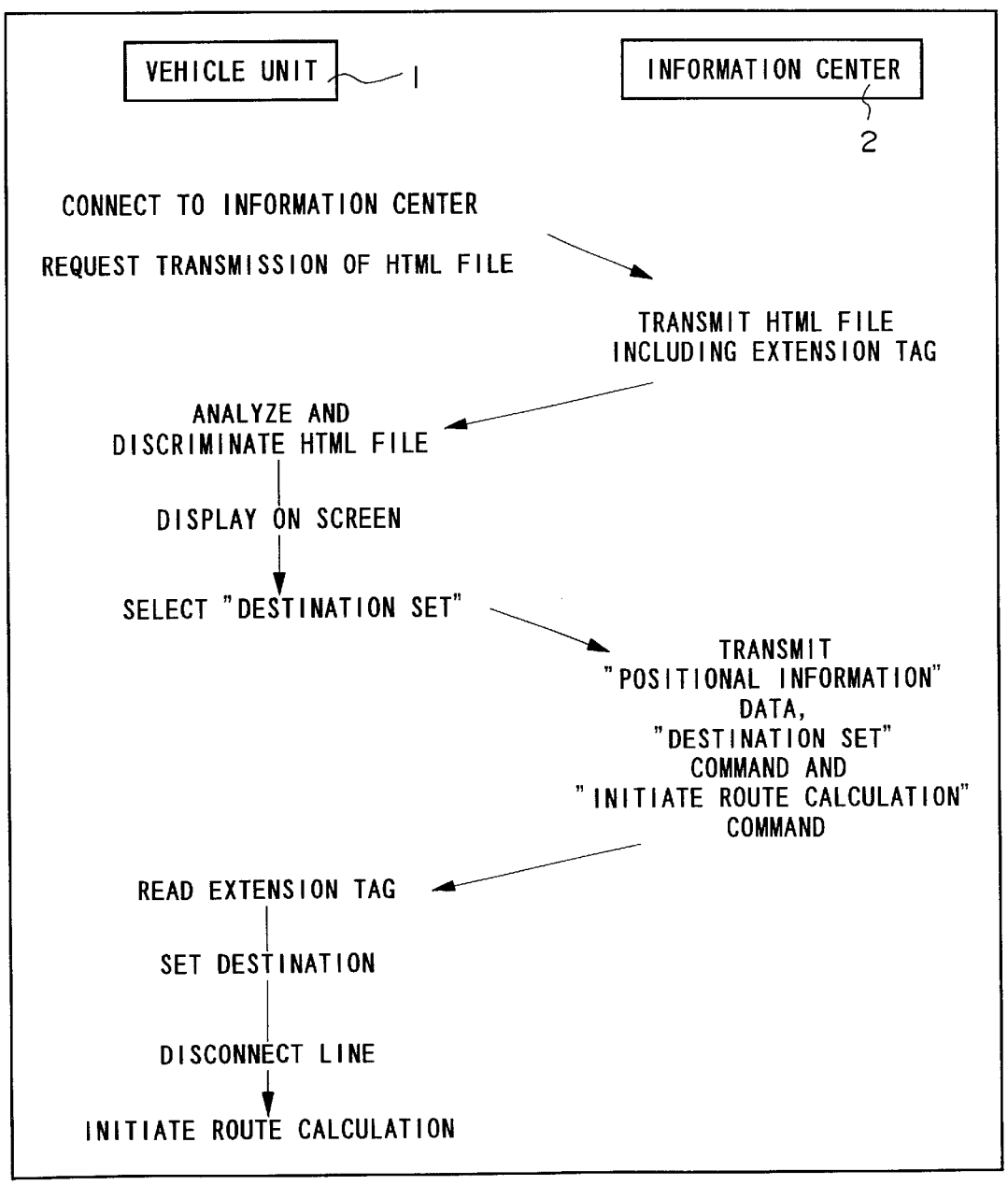
FIG. 13 is a diagram showing an example of the operation related to a destination set function.

FIG. 13 is a diagram showing an example of the operation related to a destination set function.

The vehicle unit 1 connects to the information center 2 to transmit the transmission request for an HTML file.

Upon receipt of the transmission request, the information center 2 transmits the HTML file including an extension tag, to the vehicle unit 1.

Upon receipt of the HTML file, the vehicle unit 1 analyzes and discriminates the HTML file and displays the function selection menu on the screen.

When the user selects a "destination set" from the function selection menu, the vehicle unit 1 transmits the selected function to the information center 2.

Upon receipt of the selected function, the information center 2 transmits the information necessary for executing the function to the vehicle unit 1 in an HTML file. Here the information to be transmitted contains data (positional information) and command (destination set, initiation of the route calculation).

Upon receipt of various tags, the vehicle unit 1 disconnects the line. The vehicle unit 1 then sets the received data (positional information), using the received command (destination set). The vehicle unit 1 then calculates the route to the set destination, using the received command (initiation of the route calculation).

The operation shown in FIG. 13 will be explained again using a flow chart.

Figure 14:
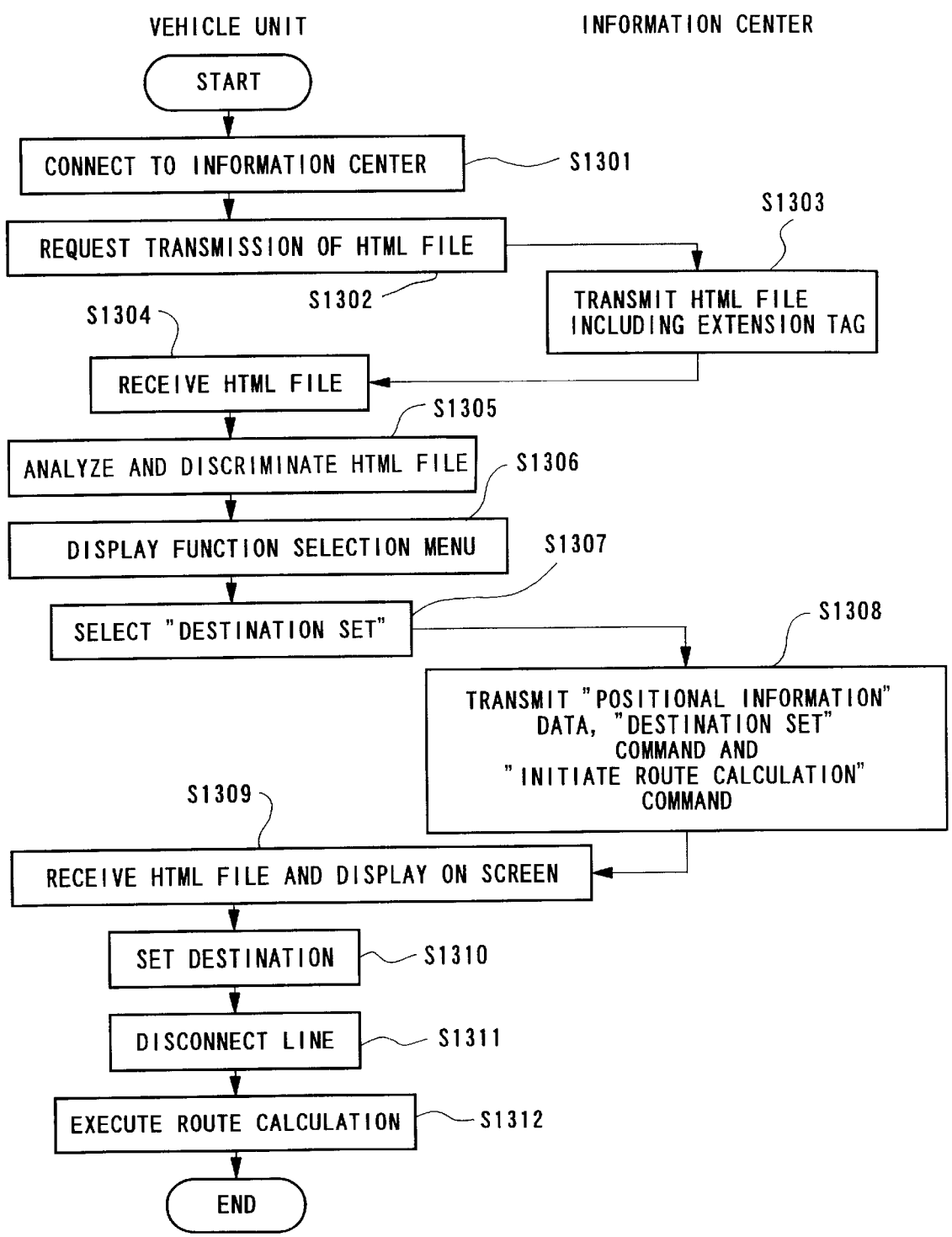
FIG. 14 is a flow chart showing an example of the operation related to the destination set function.

FIG. 14 is a flow chart showing an example of the operation related to the destination set function.

At first the vehicle unit 1 connects to the information center 2 (Step S1301).

Upon completion of the connection, the vehicle unit 1 transmits a transmission request for an HTML file to the information center 2 (Step S1302).

Upon receipt of the transmission request, the information center 2 transmits the HTML file including the extension tag to the vehicle unit 1 (Step S1303).

The vehicle unit 1 then receives the transmitted HTML file (Step S1304).

The vehicle unit 1 then analyzes and discriminates the received HTML file (Step S1305). That is to say, the vehicle unit 1 discriminates whether the descriptive content of the received HTML file is a normal tag or an extension tag. More specifically, when a tag not normally used on the Internet, such as <NAVIDATA> and <NAVIINPUT> is found in the HTML file, the vehicle unit 1 discriminates the description within the range of from <NAVIDATA> to </NAVIDATA> or from <NAVIINPUT> to </NAVIINPUT> as the descriptor for the navigation function (extension tag). Though not shown in FIG. 4, as a result of the above discrimination, when an extension tag exists in the HTML file, as in FIG. 7, the vehicle unit 1 executes the navigation function, based on the extension tag.

The vehicle unit 1 displays the function selection menu (not shown) (destination set, mark set, positional information transmission, center information update, and the like) on the screen, based on the normal tag in the HTML file (Step S1306).

When the user selects a "destination set" from the function selection menu, the vehicle unit 1 transmits the selected function to the information center 2 (Step S1307).

Upon receipt of the selected function, the information center 2 transmits various tags necessary for executing the function to the vehicle unit 1 (Step S1308). The tags to be transmitted here are data (positional information) and command (destination set, initiation of the route calculation).

The vehicle unit 1 displays sequentially on the screen the names, locations and telephone numbers of a plurality of facilities (restaurants, hot springs and the like) and characteristic information of the facility (business hours, fees and the like) (Step S1309). In this case, when it is not possible to display on one screen, the next facility is displayed every time a switch (not shown) is operated.

The driver watches the contents (explanation) of the displayed facilities to decide on the place where he/she wants to visit, and sets this place as the destination (Step S1310).

The vehicle unit 1 then disconnects the line (Step S1311).

The vehicle unit 1 calculates the route to the set destination, using the received command (initiation of the route calculation) (Step S1312).

(2) Mark Set

Figure 15:
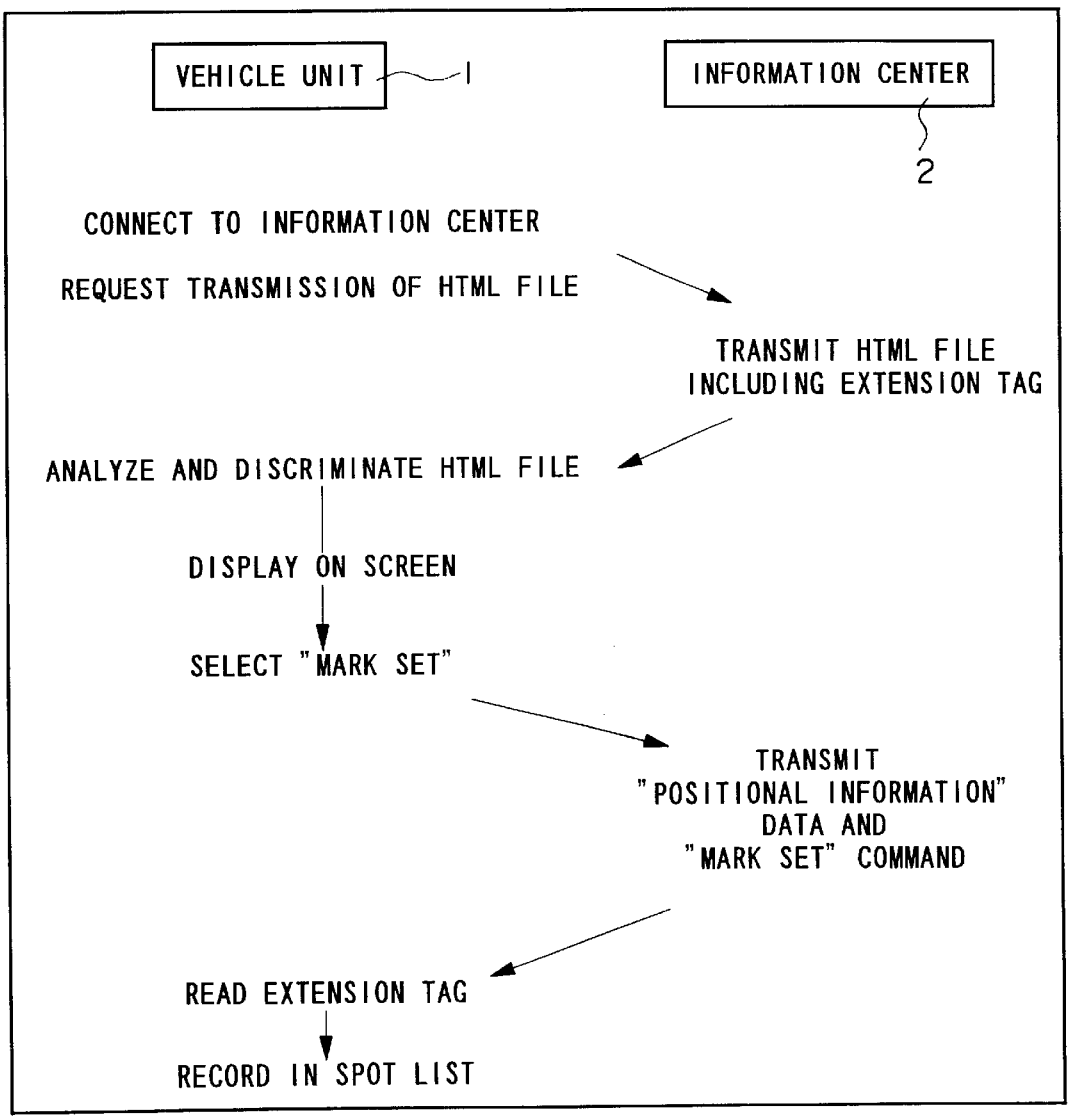
FIG. 15 is a diagram showing an example of the operation related to a mark set function.

FIG. 15 is a diagram showing an example of the operation related to the mark set function.

The vehicle unit 1 connects to the information center 2, and transmits the transmission request for an HTML file.

Upon receipt of the transmission request, the information center 2 transmits the HTML file including an extension tag, to the vehicle unit 1.

Upon receipt of the HTML file, the vehicle unit 1 analyzes and discriminates the HTML file and displays the function selection menu on the screen.

When the user selects a "mark set" from the function selection menu, the vehicle unit 1 transmits the selected function to the information center 2.

Upon receipt of the selected function, the information center 2 transmits various tags necessary for executing the function to the vehicle unit 1. The tags to be-transmitted herein are data (positional information) and command (mark set).

Upon receipt of the various tags, the vehicle unit 1 registers the received data (positional information) in the recording list of the vehicle unit 1, using the received command (mark set).

The operation shown in FIG. 15 will be explained again using a flow chart.

Figure 16:
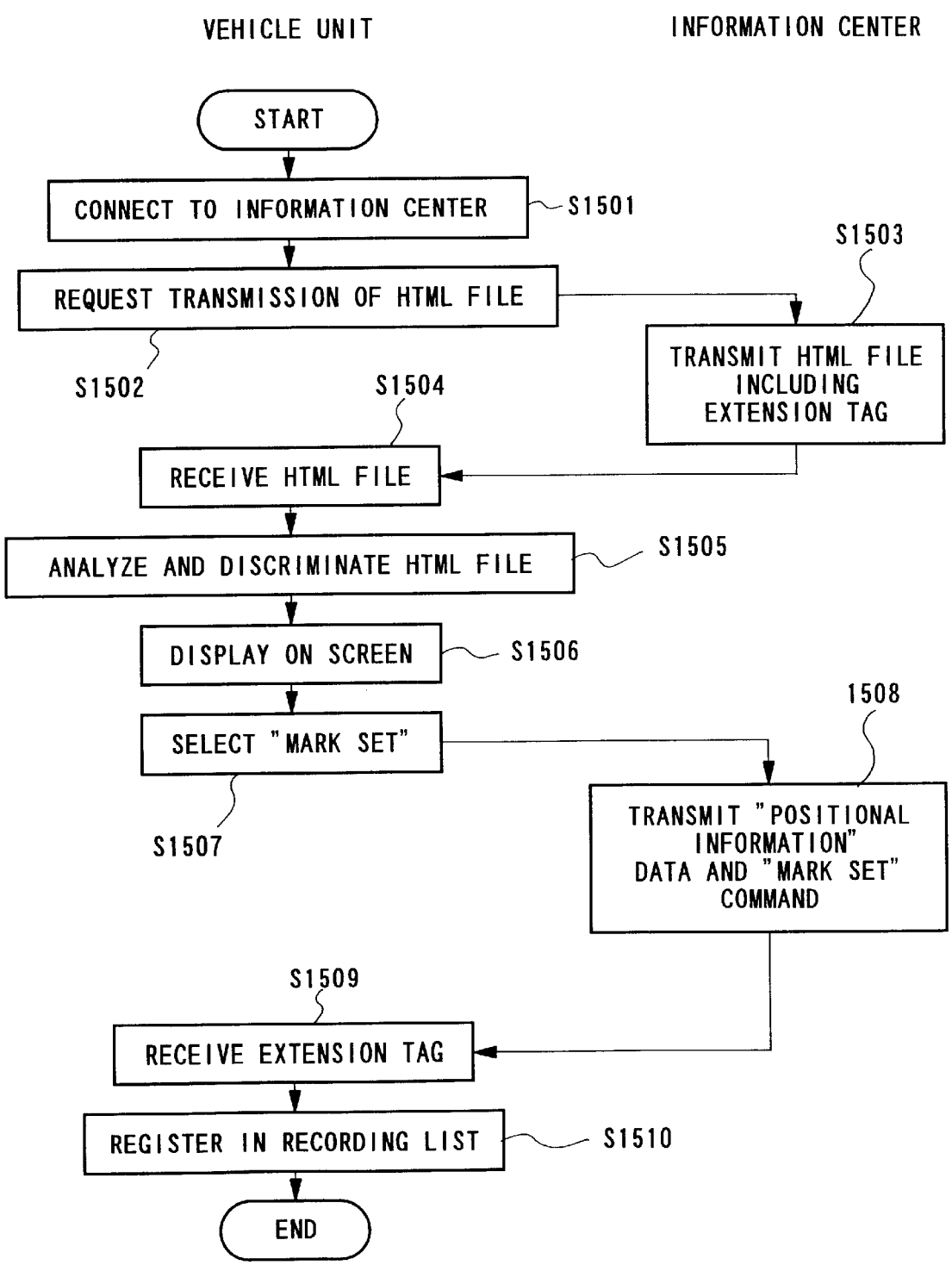
FIG. 16 is a flow chart showing an example of the operation related to the mark set function.

FIG. 16 is a flow chart showing an example of the operation related to the mark set function.

At first the vehicle unit 1 connects to the information center 2 (Step S1501).

Upon completion of the connection, the vehicle unit 1 transmits the transmission request for an HTML file to the information center 2 (Step S1502).

Upon receipt of the transmission request, the information center 2 transmits the HTML file including the extension tag to the vehicle unit 1 (Step S1503).

The vehicle unit 1 then receives the transmitted HTML file (Step S1504).

The vehicle unit 1 then analyzes and discriminates the received HTML file (Step S1505). That is to say, the vehicle unit 1 discriminates whether the descriptive content of the received HTML file is a normal tag or an extension tag. More specifically, when a tag not normally used on the Internet, such as <NAVIDATA> and <NAVIINPUT> is found in the HTML file, the vehicle unit 1 discriminates the description within the range of from <NAVIDATA> to </NAVIDATA> or from <NAVIINPUT> to </NAVIINPUT> as the descriptor for the navigation function (extension tag). Though not shown in FIG. 16, as a result of the above discrimination, when an extension tag exists in the HTML file, as in FIG. 7, the vehicle unit 1 executes the navigation function, based on the extension tag.

The vehicle unit 1 displays the function selection menu on the screen, based on the normal tag in the HTML file (Step S1506).

When the user selects a "mark set" from the function selection menu, the vehicle unit 1 transmits the selected function to the information center 2 (Step S1507).

Upon receipt of the selected function, the information center 2 transmits various tags necessary for executing the function to the vehicle unit 1 (Step S1508). The tags to be transmitted here are data (positional information) and command (mark set).

The vehicle unit 1 receives the transmitted various tags (Step S1509).

The vehicle unit 1 registers the received data (positional information) in the recording list of the vehicle unit 1, using the received command (mark set) (Step S1510).

(3) Coordinate Automatic Transmission.

Figure 17:
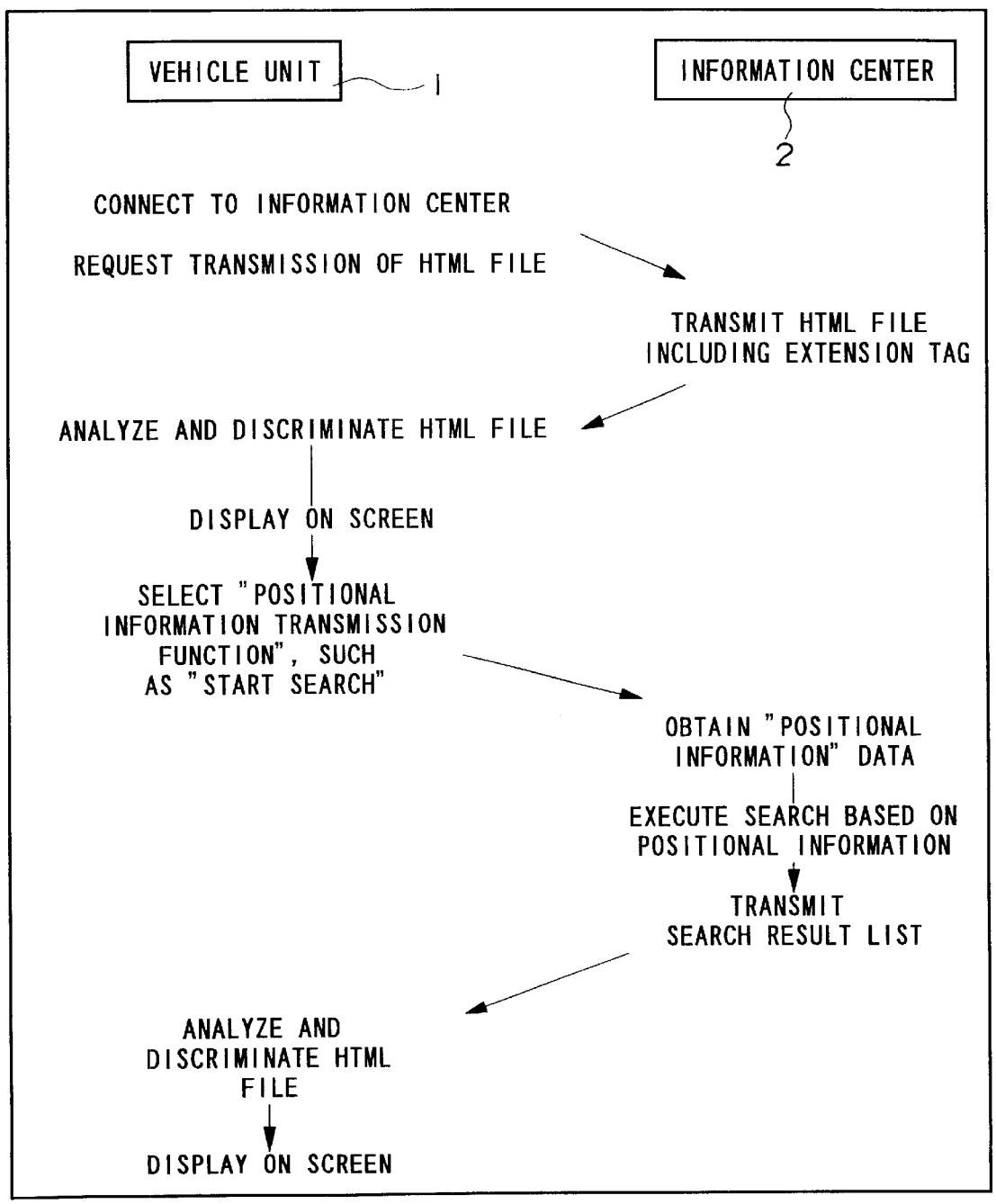
FIG. 17 is a diagram showing an example of the operation related to a coordinate automatic transmission function.

FIG. 17 is a diagram showing an example of the operation related to a coordinate automatic transmission function.

The vehicle unit 1 connects to the information center 2 to transmit the transmission request for an HTML file.

Upon receipt of the transmission request, the information center 2 transmits the HTML file including an extension tag, to the vehicle unit 1.

Upon receipt of the HTML file, the vehicle unit 1 analyzes and discriminates the HTML file and displays the function selection menu on the screen.

When the user selects a positional information transmission function such as "start search" from the function selection menu, the vehicle unit 1 transmits the positional information (coordinates) stored in the vehicle unit 1 to the information center 2. At this time, as the positional information to be transmitted, there can be considered for example the present location, the destination, and one optional location (on the map).

Upon receipt of the positional information (coordinates), the information center 2 performs a search based on the coordinates (the search method differs according to the server). The information center 2 then transmits the search result to the vehicle unit 1 as the HTML for displaying the list.

Upon receipt of the HTML file, the vehicle unit 1 analyzes and discriminates the HTML file and displays the search result on the screen.

In the embodiment of FIG. 17, a function for setting the search range of the specific information to be searched (facility information) is added (to FIG. 13). With this embodiment, the present location, the destination, or an optional spot on the map is transmitted to the information center 2, and the facility information in the vicinity of the spot is searched. Hence the search is limited to the information of an area the driver desires so that unnecessary information is not displayed, and the search speed is improved.

The operation shown in FIG. 17 will be explained again using a flow chart.

Figure 18:
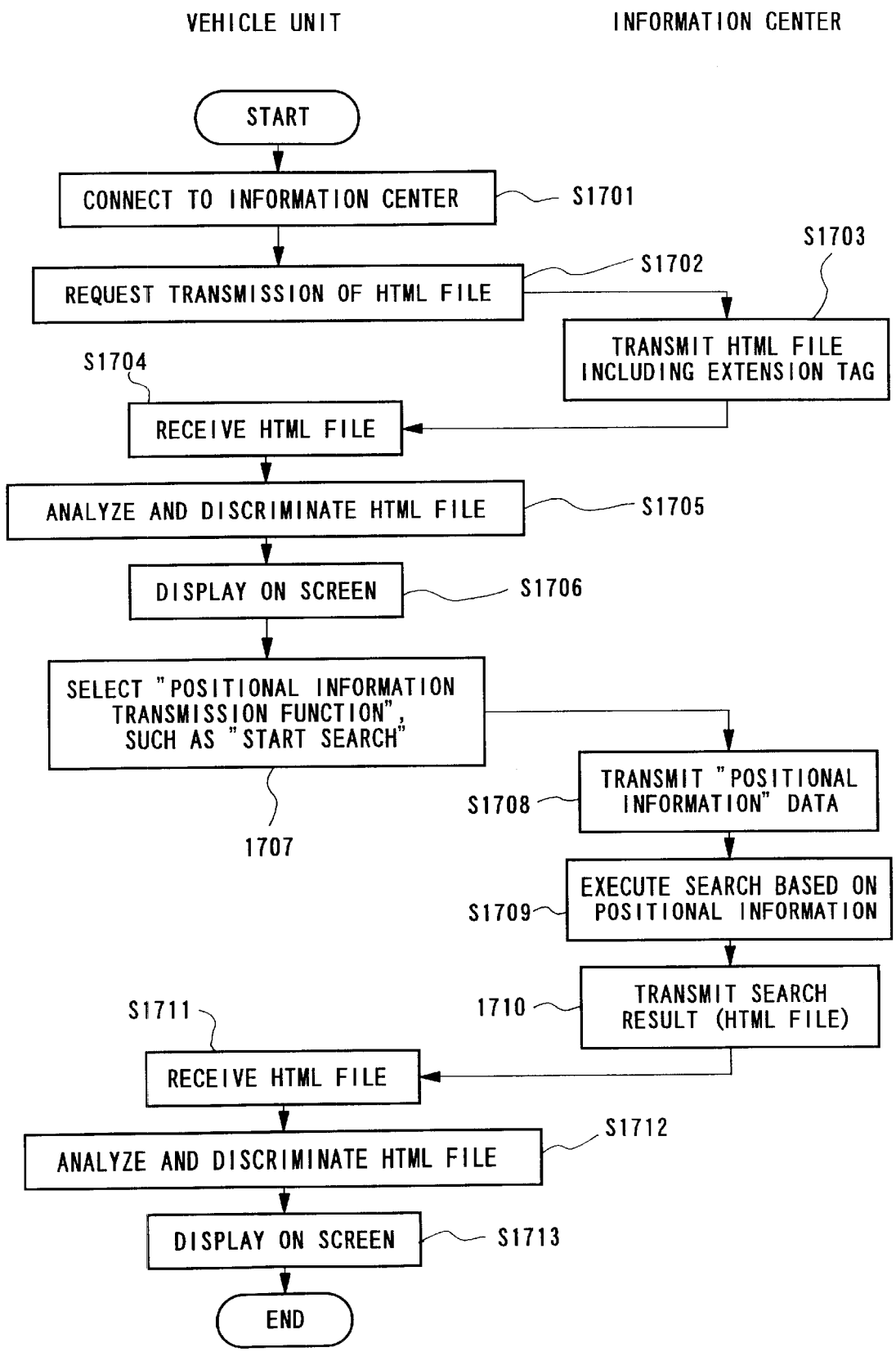
FIG. 18 is a flow chart showing an example of the operation related to the coordinate automatic transmission function.

FIG. 18 is a flow chart showing an example of the operation related to the coordinate automatic transmission function.

At first the vehicle unit 1 connects to the information center 2 (Step S1701).

Upon completion of the connection, the vehicle unit 1 transmits a transmission request for an HTML file to the information center 2 (Step S1702).

Upon receipt of the transmission request, the information center 2 transmits the HTML file including the extension tag to the vehicle unit 1 (Step S1703).

The vehicle unit 1 then receives the transmitted HTML file (Step S1704).

The vehicle unit 1 then analyzes and discriminates the received HTML file (Step S1705). That is to say, the vehicle unit 1 discriminates whether the descriptive content of the received HTML file is a normal tag or an extension tag. More specifically, when a tag not normally used on the Internet, such as <NAVIDATA> and <NAVIINPUT> is found in the HTML file, the vehicle unit 1 discriminates the description within the range of from <NAVIDATA> to </NAVIDATA> or from <NAVIINPUT> to </NAVIINPUT> as the descriptor for the navigation function (extension tag). Though not shown in FIG. 18 as a result of the above discrimination, when an extension tag exists in the HTML file, as in FIG. 7, the vehicle unit 1 executes the navigation function, based on the extension tag.

The vehicle unit 1 displays the function selection menu on the screen, based on the normal tag in the HTML file (Step S1706).

When the user selects a positional information transmission function such as "start search" from the function selection menu, the vehicle unit 1 transmits the positional information (coordinates) stored in the vehicle unit 1 to the information center 2 (Step S1707). At this time, as the positional information to be transmitted, there can be considered for example the present location, the destination, and one optional location (on the map).

The information center 2 receives the transmitted positional information (coordinates) (Step S1708).

The information center 2 performs a search based on the received positional information (coordinates) (Step S1709). The search method differs according to the server.

Upon completion of the search, the information center 2 transmits the search result to the vehicle unit 1 as the HTML for displaying the list (Step S1710).

The information center 2 receives the transmitted HTML file (Step S1711).

The vehicle unit 1 analyzes and discriminates the received HTML file as in Step S1705 (Step S1712).

The vehicle unit 1 displays the search result on the screen, based on the normal tag in the HTML file (Step S1713).

Though not shown in FIG. 18, subsequent to the flow chart of FIG. 18, the step may proceed to the abovementioned "(1) Destination set" (processing for setting the destination from the displayed plural facilities).

(4) Automatic Update of the Center Information

Figure 19:
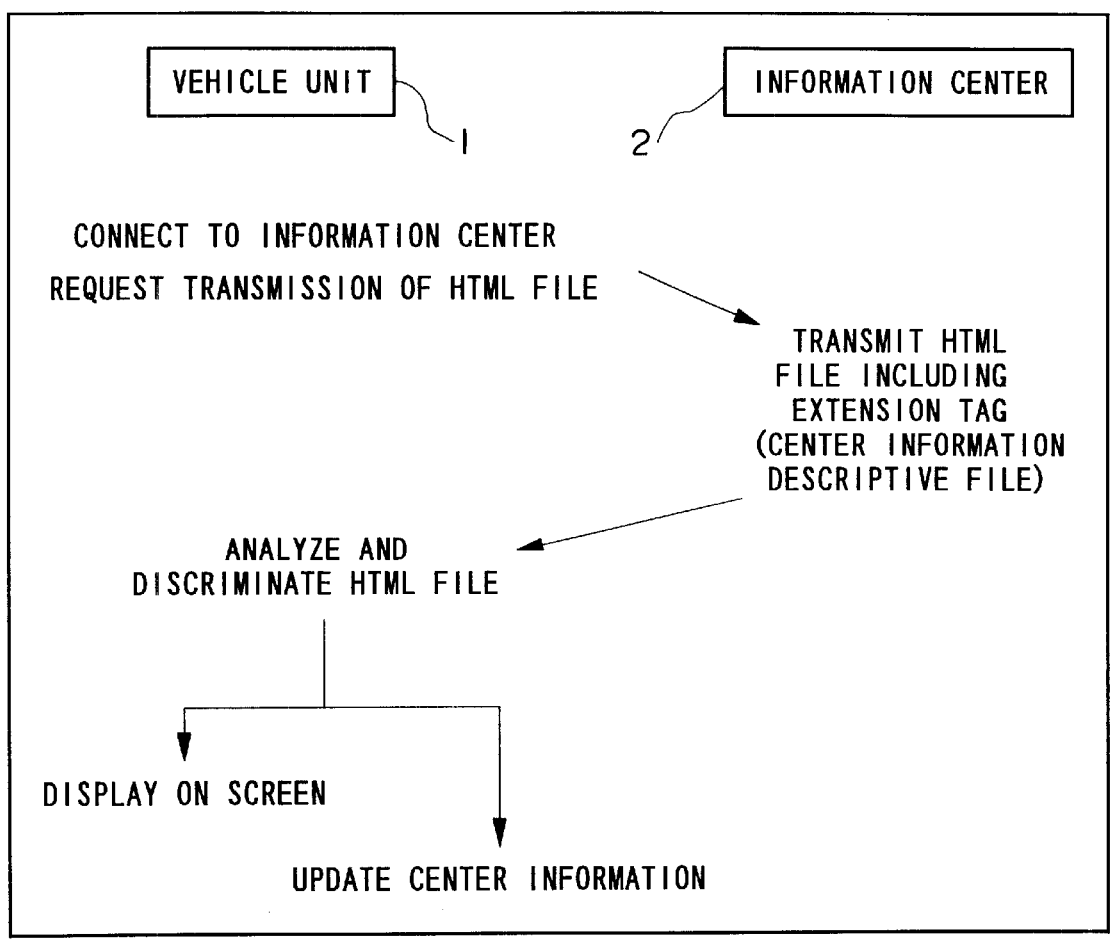
FIG. 19 is a diagram showing an example of the operation related to an automatic update function of the center information.

FIG. 19 is a diagram for explaining the automatic update function of the center information. The information center 2 may sometimes change various settings (telephone number, communication procedure or the like) for the connection to the vehicle unit 1. Therefore, by transmitting the setting in advance from the information center 2 to the vehicle unit 1 and changing the setting of the vehicle unit 1, the communication function with the information center 2 can be maintained without the setting change being perceived by the driver. This function does not require the execution command from the driver and is automatically performed.

The vehicle unit 1 connects to the information center 2 to transmit the transmission request for the HTML file.

Upon receipt of the transmission request, the information center 2 transmits the HTML file including the extension tag to the vehicle unit 1. In the extension tag, the information (telephone number and the like) necessary for connecting to the information center 2 is described. In addition, since the extension tag is set not to be displayed, the user cannot see the description in the extension tag on the screen.

Upon receipt of the HTML file, the vehicle unit 1 analyzes and discriminates the HTML file, and automatically updates the information of the center to which the connection is made.

The operation shown in FIG. 19 will be explained again using a flow chart.

Figure 20:
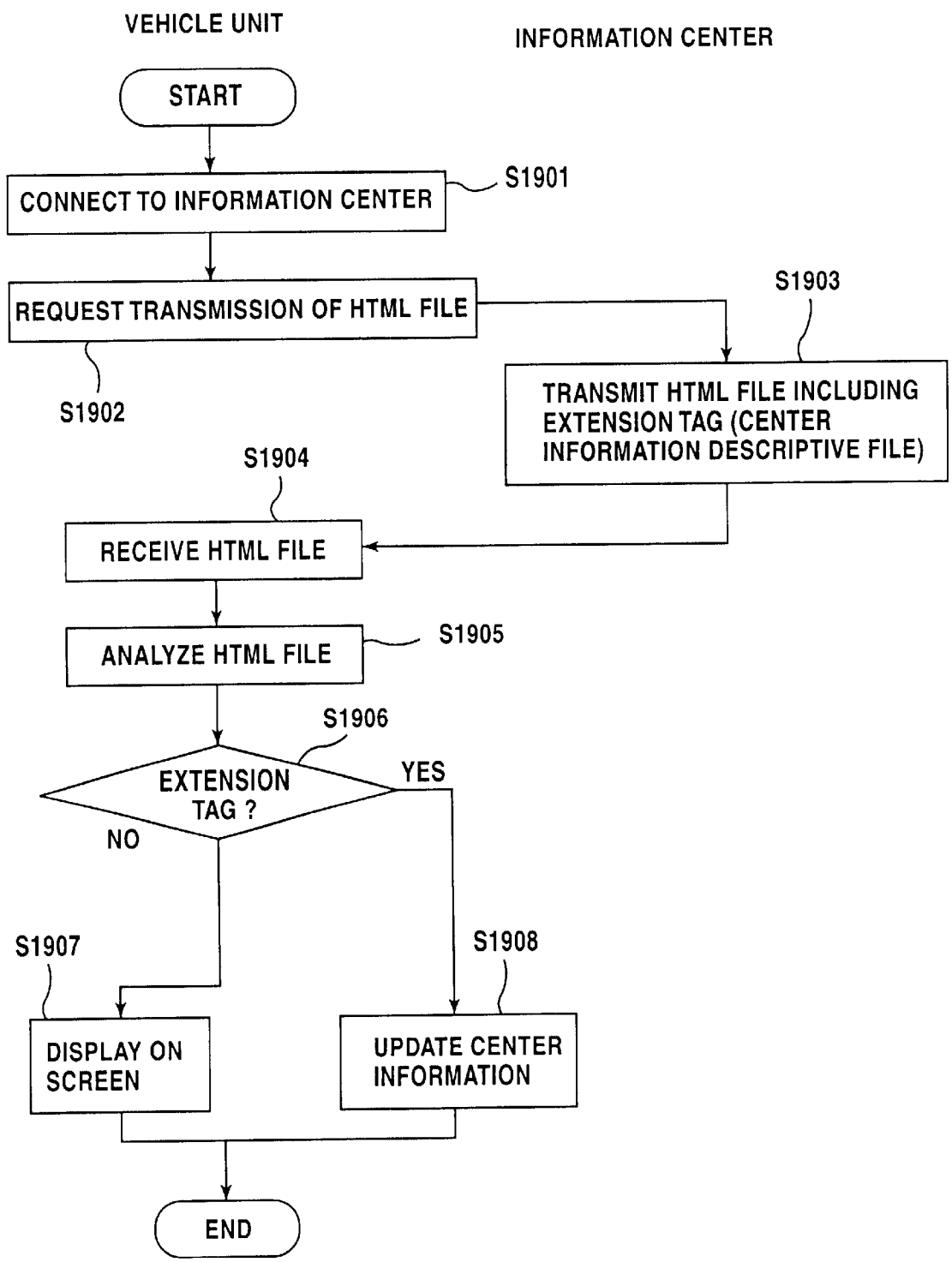
FIG. 20 is a flow chart showing an example of the operation related to the automatic update function of the center information.

FIG. 20 is a flow chart showing an example of the operation related to the automatic update function of the center information.

At first the vehicle unit 1 connects to the information center 2 (Step S1901).

Upon completion of the connection, the vehicle unit 1 transmits a transmission request for an HTML file to the information center 2 (Step S1902).

Upon receipt of the transmission request, the information center 2 transmits the HTML file including the extension tag to the vehicle unit 1 (Step S1903). In the extension tag, the information (telephone number and the like) necessary for connecting to the information center 2 is described. In addition, since the extension tag is set not to be displayed, the user cannot see the description in the extension tag on the screen.

The vehicle unit 1 then receives the transmitted HTML file (Step S1904).

The vehicle unit 1 then analyzes the received HTML file (Step S1905).

Based on the analysis result, the vehicle unit 1 discriminates whether the descriptive content of the received HTML file is a normal tag or an extension tag. More specifically, when a tag not normally used on the Internet, such as <NAVIDATA> and <NAVIINPUT> is found in the HTML file, the vehicle unit 1 discriminates the description within the range of from <NAVIDATA> to </NAVIDATA> or from <NAVIINPUT> to </NAVIINPUT> as the descriptor for the navigation function (extension tag).

When this discrimination result is "NO", the vehicle unit 1 performs screen display, based on the normal tag in the HTML file (Step S1907).

On the other hand, when this discrimination result is "YES", that is, when an extension tag exists in the HTML file, the vehicle unit 1 automatically updates the information of the center to which the connection is made, based on the extension tag (Step S1908).

This completes the explanation of the operation of the navigation system according to the above construction.

The embodiment of the present invention has been described in detail with reference to the accompanying drawings. However, the actual construction is not limited to this embodiment, and the present invention includes all changes in the design without departing from the scope of the present invention.

Figure 21:
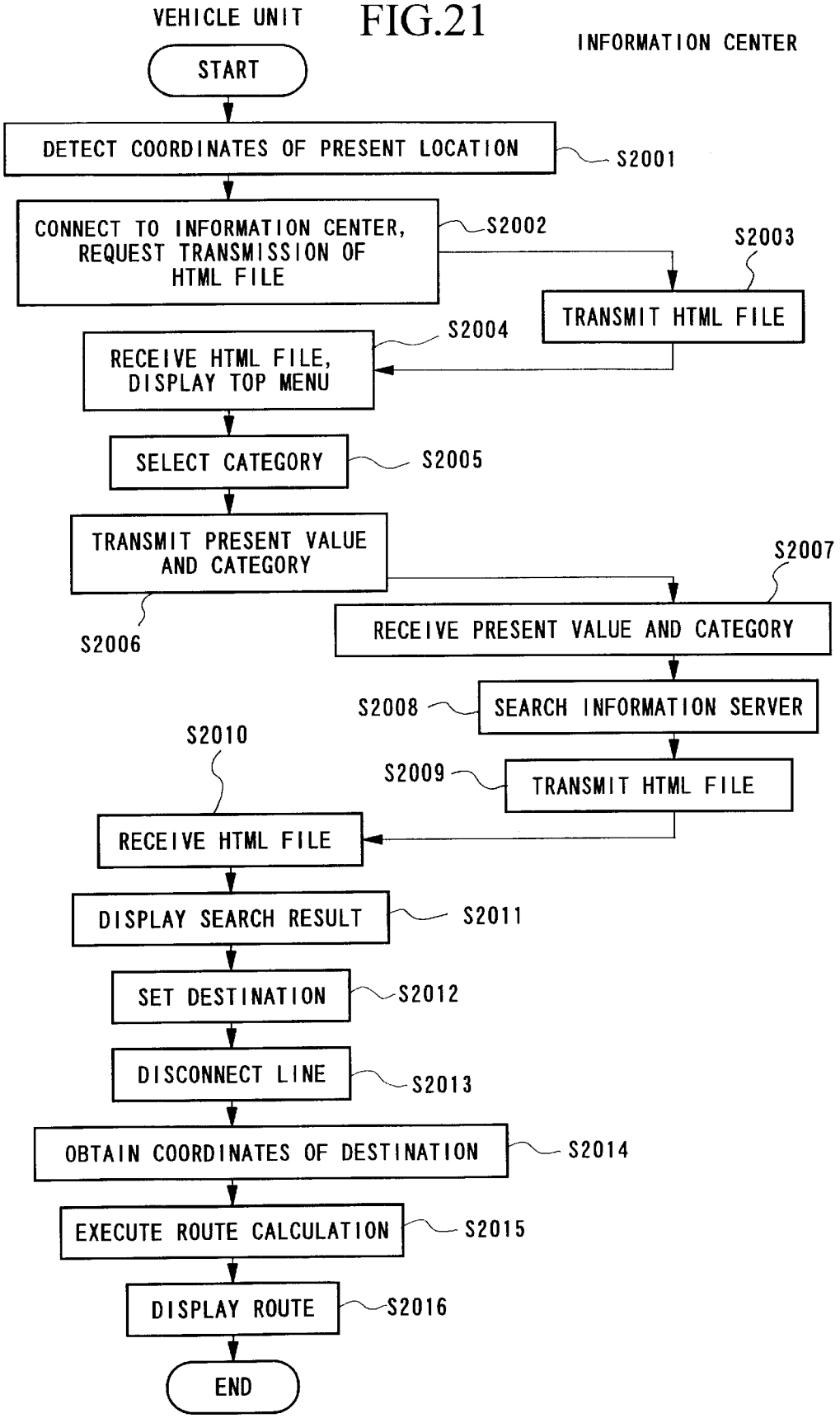
FIG. 21 is a flow chart showing the operation of a working example of the present invention.

An actual working example based on the above embodiment will now be described with reference to the drawings. In this example, the case is assumed where "in order to make a trip to a nearby hot spring (within a predetermined distance from the present location), appropriate hot spring information is searched from the information center 2". FIG. 21 is a flow chart showing an operation of the vehicle unit 1 and the information center 2 for this case.

At first the vehicle unit 1 detects the coordinates of the present location of the vehicle (Step S2001).

The vehicle unit 1 then connects to the information center 2 and transmits a transmission request for an HTML file to the information center 2 (Step S2002).

When the vehicle unit 1 is connected to the information center 2, as an example, the following tag is used:

<NAVIDATA TYPE=CENTER SRC="CENTER.INF" FILE="NVDATADR/CENTER/PARA.DAT">
</NAVIDATA>

Here, NAVIDATA indicates an extension tag. Moreover, TYPE=CENTER indicates connection to the information center 2. SRC="CENTER.INF" designates the URL of the information center 2. In addition, FILE="NVDATADR/CENTER/PARA.DAT" designates the storage place for the data received from the information center 2. This tag does not affect the display screen.

Upon receipt of the above transmission request, the information center 2 transmits the HTML file for displaying the top menu information to the vehicle unit 1 (Step S2003).

Here, the HTML file to be transmitted is constituted only by normal tags. Examples of normal tags are shown below.

<HTML>
<HEAD>
<TITLE>NAVIGATION NETWORK </TITLE>
</HEAD>
<BODY BGCOLOR="blue" TEXT="black">
<CENTER>
<FONT SIZE="6">
TOP MENU <BR>
  1. Hot spring guide <BR>
  2. Golf guide <BR>
  3. Shopping<BR>
  4. Concert <BR>
</FONT SIZE>
</CENTER>
</BODY>
</HTML>

Figure 22:
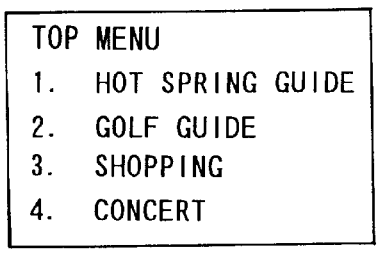
FIG. 22 is a diagram showing an example of a display screen in the case of displaying a menu.

The vehicle unit 1 then receives the transmitted HTML file and displays the top menu based on the HTML file (Step S2004, see FIG. 22). Here BODY BGCOLOR="blue" TEXT="black" indicates that the background is displayed in blue and characters are displayed in black. FONT SIZE="6" indicates that the characters are displayed in a previously prescribed size (in a size prescribed as number "6"). In addition, CENTER indicates that characters are displayed in the center of each line.

The user selects a desired category from the displayed top menu (Step S2005). Here, it is assumed that "1. Hot spring guide" is selected.

When the category is selected, the vehicle unit 1 transmits the coordinates of the present location and the selected category to the information center 2 (Step S2006).

In the case where the present location of the vehicle is transmitted to the information center 2, as an example, the following tag is used:

<NAVIINPUT TYPE=POSITION NAME=CUR_POS>
</NAVIINPUT>

In this way, the coordinates of the present location stored in the memory of the vehicle unit 1 body are transmitted to the information center 2. NAVIINPUT indicates an extension tag. In addition, TYPE=POSITION NAME=CUR_POS indicates that the content of this tag is the present location data of the vehicle. This tag does not affect the display screen.

The information center 2 receives the coordinates of the present location and the selected category (hot spring) (Step S2007).

Upon receipt of the coordinates and the category, the information center 2 searches the information server 22 and takes out the information for the category (hot spring) within a predetermined distance from the present location of the vehicle (Step S2008).

The information center 2 transmits the HTML file for the taken-out information (Step S2009). This HTML file is composed of a normal tag and an extension tag. In the normal tag, names, telephone numbers, images of (one or a plurality of) hot springs existing within the above-mentioned predetermined distance are described. In the extension tag, the coordinates of the hot spring are described.

The vehicle unit 1 receives the transmitted HTML file (Step S2010).

Figure 23A:
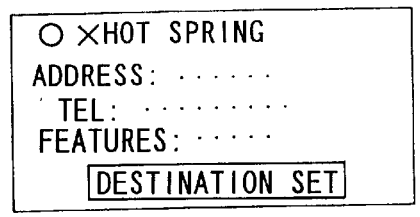
FIGS. 23A, 23B, 23C, 23D and 23E are diagrams showing an example of a display screen when the destination is set.

The vehicle unit 1 sequentially displays the location and the characteristic information of a plurality of facilities from the facility information received from the information server (Step S2011, see FIG. 23A). In this case, when it is not possible to display on one screen, the next facility is displayed every time a switch (not shown) is operated.

In the example shown in FIG. 23A, information related to one hot spring is displayed on one screen (one page). By pushing a touch key "skip" (not shown) displayed on the screen, the screen is changed, and hot spring information of another page is displayed.

Furthermore, in step S2011, the map in the vicinity of the hot spring can be displayed. In this case, as an example, the following tag is used:

<NAVIDATA TYPE=HYPER_CTL_MAP SRC="onsen_map" FILE="navdatdr/scale/onsen_map">
</NAVIDATA>

Here NAVIDATA indicates an extension tag. TYPE=HYPER_CTL_MAP indicates the change-over instruction from the browser mode (character display) to the navigation mode (map display). SRC="onsen_map" indicates the URL of the hot spring map. FILE="navdatdr/scale/onsen_map" designates the storage place for the data received from the information center 2.

Figures 24A, 24B, 24C:
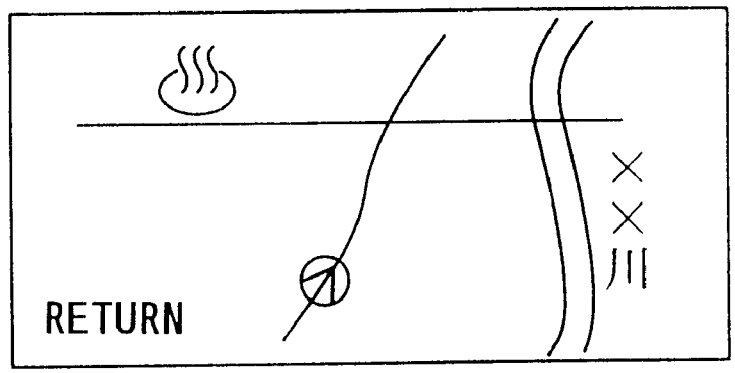
FIGS. 24A, 24B and 24C are diagrams showing an example of a display screen when a map is displayed.
Figure 25:
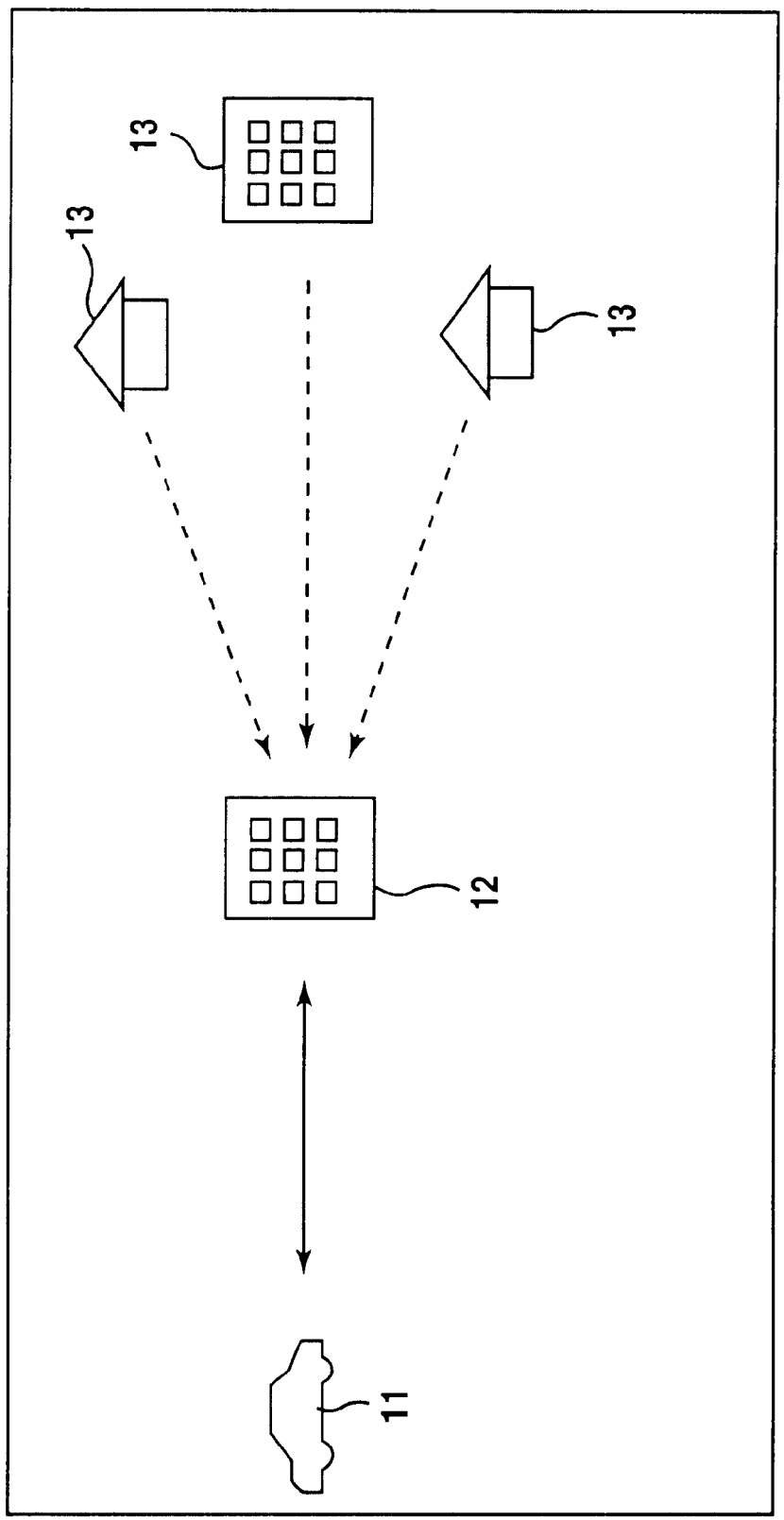
FIG. 25 is a diagram showing an example of the construction of a conventional navigation system.

FIGS. 24A, 24B and 24C are diagrams showing an example of the display screen when a map is displayed. As shown in these figures, if while the information regarding a hot spring is being displayed, a touch key "Confirm the map" displayed on the screen is pushed, the map in the vicinity of the hot spring is displayed. Moreover, when a touch key "return" displayed on the screen is pushed, the screen returns to the former screen.

Figure 23B:
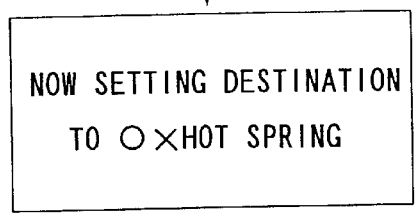

Referring to the abovementioned information, the user selects the destination from among a plurality of facilities displayed sequentially (Step S2012). This operation is performed by pushing a touch key "Destination Set" displayed on the screen (see FIG. 23A and FIG. 24C). Hence, the screen shown in FIG. 23B appears.

The vehicle unit 1, as an example, executes the extension tag shown below, in order to set the selected spot (hot spring) as the destination:

<NAVIDATA TYPE=HYPER_POS_DSRTE SRC="onsen"FILE="navdatdr/hp_dstrt/onsen">
</NAVIDATA>

Here, NAVIDATA indicates an extension tag. TYPE=HYPER_POS_DSRTE indicates that the destination is specified. SRC="onsen" designates the URL of the destination (hot spring). In addition, FILE="navdatdr/hp_dstrt/onsen" designates the storage place for the data received from the information center 2.

As an example, the contents of the above-mentioned file "onsen" are described below:

| | |
|---|---|
| name = "O X hot spring" | Name |
| position-latitude = 3012675 | X coordinate |
| position-longitude = 4352410 | Y coordinate |
| img_file = "onsen.jpg" | Photographic file |
| text_file = "onsen.txt" | Explanatory text |

Figure 23C:
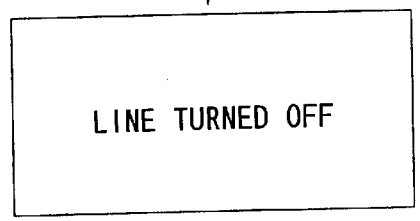

Thereafter, the vehicle unit 1 disconnects the line with the information center 2 (Step S2013, see FIG. 23C).

The vehicle unit 1 then obtains the coordinates of the destination (hot spring), based on the execution result of the extension tag (Step S2014).

Figure 23D:
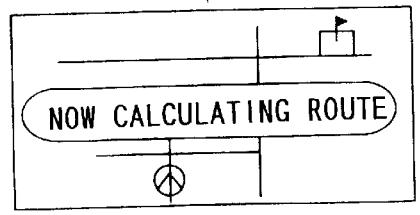

The vehicle unit 1 calculates the route to the selected destination (hot spring) (Step S2015, see FIG. 23D).

Figure 23E:
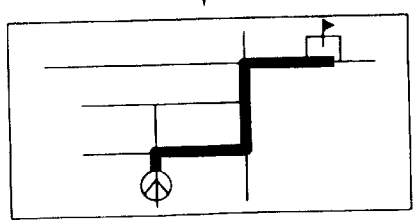

After completion of the calculation, the vehicle unit 1 displays the calculated route, and guides the user along this route (Step S2016, see FIG. 23E).

What is claimed is:

1. A navigation apparatus communicating with an information center comprises:
    reception means for receiving an information file which contains at least one of one or more normal tags and one or more extension tags from said information center, said normal tag being a descriptor which can be processed by a browser and said extension tag being a descriptor which cannot be processed by said browser;
    display function executing means for displaying a function selection menu based on said normal tag in said received information file;
    selection means for selecting a function from said function selection menu; and
    navigation function executing means for executing a navigation function based on said received information file.

2. A navigation apparatus communicating with an information center comprises:
    reception means for receiving an information file which contains at least one of one or more normal tags and one or more extension tags from said information center, said normal tag being a descriptor which can be processed by a browser and said extension tag being a descriptor which cannot be processed by said browser;
    display function executing means for displaying a function selection menu based on said normal tag in said received information file;
    selection means for selecting a destination set function from said function selection menu; and
    navigation function executing means for setting positional information indicated by said extension tag in said information file as a destination.

3. A navigation apparatus communicating with an information center comprises:
    reception means for receiving an information file which contains at least one of one or more normal tags and one or more extension tags from said information center, said normal tag being a descriptor which can be processed by a browser and said extension tag being a descriptor which cannot be processed by said browser;
    display function executing means for displaying a function selection menu based on said normal tag in said received information file;
    selection means for selecting a mark set function from said function selection menu; and
    navigation function means for executing registering position information indicated by said extension tag in said information file into a recording list of said navigation apparatus.

4. A navigation apparatus communicating with an information center comprises:
    reception means for receiving an information file which contains at least one of one or more normal tags and one or more extension tags from said information center, said normal tag being a descriptor which can be processed by a browser and said extension tag being a descriptor which cannot be processed by said browser;
    display function executing means for displaying a function selection menu based on said normal tag in said received information file;
    selection means for selecting a search function from said function selection menu;
    transmission means for transmitting positional information stored in said navigation apparatus to said information center; and
    navigation function executing means for displaying a search result obtained by said information center based on said transmitted positional information.

5. A navigation apparatus according to claim 4, wherein
    said navigation function executing means further sets positional information from said search result as a destination.

6. A navigation apparatus comprising:
    reception means for receiving an information file which contains at least one of one or more normal tags and one or more extension tags from an information center, said normal tag being a descriptor which can be processed by a browser and said extension tag being a descriptor which cannot be processed by said browser;
    discriminating means for analyzing said received information file and for discriminating whether said received information file is described by said normal tag or described by said extension tag;
    display function executing means for displaying a predetermined image based on said normal tag in said received information file; and
    navigation function executing means for executing a navigation function based on said extension tag in said received information file.

7. A computer readable storage medium which stores a program, and said program enables a computer to act as a navigation apparatus communicating with an information center comprises:
    reception means for receiving an information file which contains at least one of one or more normal tags and one or more extension tags from said information center, said normal tag being a descriptor which can be processed by a browser and said extension tag being a descriptor which cannot be processed by said browser;
    display function executing means for displaying a function selection menu based on said normal tag in said received information file;
    selection means for selecting a function from said function selection menu; and
    navigation function executing means for executing a navigation function based on said received information file.

8. A computer readable storage medium which stores a program, and said program enables a computer to act as a navigation apparatus communicating with an information center comprises:
    reception means for receiving an information file which contains at least one of one or more normal tags and one or more extension tags from said information center, said normal tag being a descriptor which can be processed by a browser and said extension tag being a descriptor which cannot be processed by said browser;

display function executing means for displaying a function selection menu based on said normal tag in said received information file;

selection means for selecting a destination set function from said function selection menu; and navigation function executing means for setting positional information indicated by said extension tag in said information file as a destination.

9. A computer readable storage medium which stores a program, and said program enables a computer to act as a navigation apparatus communicating with an information center comprises:

reception means for receiving an information file which contains at least one of one or more normal tags and one or more extension tags from said information center, said normal tag being a descriptor which can be processed by a browser and said extension tag being a descriptor which cannot be processed by said browser;

display function executing means for displaying a function selection menu based on said normal tag in said received information file;

selection means for selecting a mark set function from said function selection menu; and navigation function executing means for registering positional information indicated by said extension tag in said information file into a recording list of said navigation apparatus.

10. A computer readable storage medium which stores a program, and said program enables a computer to act as a navigation apparatus communicating with an information center comprises:

reception means for receiving an information file which contains at least one of one or more normal tags and one or more extension tags from said information center, said normal tag being a descriptor which can be processed by a browser and said extension tag being a descriptor which cannot be processed by said browser;

display function executing means for displaying a function selection menu based on said normal tag in said received information file;

selection means for selecting a search function from said function selection menu;

transmission means for transmitting positional information stored in said navigation apparatus to said information center; and navigation function executing means for displaying a search result obtained by said information center based on said transmitted positional information.

11. A computer readable storage medium according to claim 10, wherein said navigation function executing means further sets positional information from said search result as a destination.

12. A computer readable storage medium which stores a program, and said program enables a computer to act as a navigation apparatus comprising:

reception means for receiving an information file which contains at least one of one or more normal tags and one or more extension tags from an information center, said normal tag being a descriptor which can be processed by a browser and said extension tag being a descriptor which cannot be processed by said browser;

discriminating means for analyzing said received information file and for discriminating whether said received information file is described by said normal tag or described by said extension tag;

display function executing means for displaying a predetermined image based on said normal tag in said received information file; and navigation function setting means for setting a navigation function based on said extension tag in said received information file.

13. A navigation apparatus communicating with an information center comprises:

a reception device for receiving an information file which contains at least one of one or more normal tags and one or more extension tags from said information center, said normal tag being a descriptor which can be processed by a browser and said extension tag being a descriptor which cannot be processed by said browser;

a display function executing device for displaying a function selection menu based on said normal tag in said received information file;

a selection device for selecting a function from said function selection menu; and a navigation function executing device for executing a navigation function based on said received information file.

14. A navigation apparatus communicating with an information center comprises:

a reception device for receiving an information file which contains at least one of one or more normal tags and one or more extension tags from said information center, said normal tag being a descriptor which can be processed by a browser and said extension tag being a descriptor which cannot be processed by said browser;

a display function executing device for displaying a function selection menu based on said normal tag in said received information file;

a selection device for selecting a destination set function from said function selection menu; and a navigation function executing device for setting positional information indicated by said extension tag in said information file as a destination.

15. A navigation apparatus communicating with an information center comprises:

a reception device for receiving an information file which contains at least one of one or more normal tags and one or more extension tags from said information center, said normal tag being a descriptor which can be processed by a browser and said extension tag being a descriptor which cannot be processed by said browser;

a display function executing device for displaying a function selection menu based on said normal tag in said received information file;

a selection device for selecting a mark set function from said function selection menu; and a navigation function device for executing registering position information indicated by said extension tag in said information file into a recording list of said navigation apparatus.

16. A navigation apparatus communicating with an information center comprises:

a reception device for receiving an information file which contains at least one of one or more normal tags and one or more extension tags from said information center, said normal tag being a descriptor which can be processed by a browser and said extension tag being a descriptor which cannot be processed by said browser;

a display function executing device for displaying a function selection menu based on said normal tag in said received information file;

a selection device for selecting a search function from said function selection menu;

a transmission device for transmitting positional information stored in said navigation apparatus to said information center; and a navigation function executing device for displaying a search result obtained by said information center based on said transmitted positional information.

17. A navigation apparatus according to claim 16, wherein said navigation function executing device further sets positional information from said search result as a destination.

18. A navigation apparatus comprising:

a reception device for receiving an information file which contains at least one of one or more normal tags and one or more extension tags from an information center, said normal tag being a descriptor which can be processed by a browser and said extension tag being a descriptor which cannot be processed by said browser;

a discriminating device for analyzing said received information file and for discriminating whether said received information file is described by said normal tag or described by said extension tag;

a display function executing device for displaying a predetermined image based on said normal tag in said received information file; and a navigation function executing device for executing a navigation function based on said extension tag in said received information file.

19. A computer readable storage medium which stores a program, and said program enables a computer to act as a navigation apparatus communicating with an information center, wherein said program performs the following steps comprising:

a reception step for receiving an information file which contains at least one of one or more normal tags and one or more extension tags from said information center, said normal tag being a descriptor which can be processed by a browser and said extension tag being a descriptor which cannot be processed by said browser;

a display function executing step for displaying a function selection menu based on said normal tag in said received information file;

a selection step for selecting a function from said function selection menu; and a navigation function executing step for executing a navigation function based on said received information file.

20. A computer readable storage medium which stores a program, and said program enables a computer to act as a navigation apparatus communicating with an information center, wherein said program performs the following steps comprising:

a reception step for receiving an information file which contains at least one of one or more normal tags and one or more extension tags from said information center, said normal tag being a descriptor which can be processed by a browser and said extension tag being a descriptor which cannot be processed by said browser;

a display function executing step for displaying a function selection menu based on said normal tag in said received information file;

a selection step for selecting a destination set function from said function selection menu; and a navigation function executing step for setting positional information indicated by said extension tag in said information file as a destination.

21. A computer readable storage medium which stores a program, and said program enables a computer to act as a navigation apparatus communicating with an information center, wherein said program performs the following steps comprising:

a reception step for receiving an information file which contains at least one of one or more normal tags and one or more extension tags from said information center, said normal tag being a descriptor which can be processed by a browser and said extension tag being a descriptor which cannot be processed by said browser;

a display function executing step for displaying a function selection menu based on said normal tag in said received information file;

a selection step for selecting a mark set function from said function selection menu; and a navigation function executing step for registering positional information indicated by said extension tag in said information file into a recording list of said navigation apparatus.

22. A computer readable storage medium which stores a program, and said program enables a computer to act as a navigation apparatus communicating with an information center, wherein said program performs the following steps comprising:

a reception step for receiving an information file which contains at least one of one or more normal tags and one or more extension tags from said information center, said normal tag being a descriptor which can be processed by a browser and said extension tag being a descriptor which cannot be processed by said browser;

a display function executing step for displaying a function selection menu based on said normal tag in said received information file;

a selection step for selecting a search function from said function selection menu;

a transmission step for transmitting positional information stored in said navigation apparatus to said information center; and a navigation function executing step for displaying a search result obtained by said information center based on said transmitted positional information.

23. A computer readable storage medium according to claim 22, wherein said navigation function executing step further sets positional information from said search result as a destination.

24. A computer readable storage medium which stores a program, and said program enables a computer to act as a navigation apparatus, wherein said program performs the following steps comprising:

a reception step for receiving an information file which contains at least one of one or more normal tags and one or more extension tags from an information center, said normal tag being a descriptor which can be processed by a browser and said extension tag being a descriptor which cannot be processed by said browser;

a discriminating step for analyzing said received information file and for discriminating whether said received information file is described by said normal tag or described by said extension tag;

a display function executing step for displaying a predetermined image based on said normal tag in said received information file; and a navigation function setting step for setting a navigation function based on said extension tag in said received information file.

* * * * *